(12) United States Patent
Albrecht et al.

(10) Patent No.: US 7,083,849 B1
(45) Date of Patent: Aug. 1, 2006

(54) BREATHABLE POLYMER FOAMS

(75) Inventors: Bonnie Weiskopf Albrecht, Lake Elmo, MN (US); Mark David Gehlsen, Eagan, MN (US); Connie Lynn Hubbard, River Falls, WI (US); David Loren Vall, Woodbury, MN (US); Bryan C. Feisel, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/325,963

(22) Filed: Jun. 4, 1999

(51) Int. Cl.
*B32B 3/26* (2006.01)
*B32B 7/12* (2006.01)
*B32B 9/00* (2006.01)
*B05D 5/10* (2006.01)

(52) U.S. Cl. .............. 428/304.4; 428/316.6; 428/317.1; 428/317.3; 428/318.4; 428/343; 428/354; 427/208

(58) Field of Classification Search ............ 428/316.6, 428/318.4, 317.1, 317.3, 343, 354; 427/208
See application file for complete search history.

(56) References Cited

U.S. PATENT DOCUMENTS

| | | | | |
|---|---|---|---|---|
| 2,956,310 A | * | 10/1960 | Roop et al. ............... 18/57 |
| 3,379,802 A | | 4/1968 | Raley et al. .............. 264/53 |
| 3,426,754 A | | 2/1969 | Bierenbaum et al. ....... 128/156 |
| 3,539,666 A | | 11/1970 | Schirmer .................. 264/51 |
| 3,549,470 A | | 12/1970 | Greenwald et al. .......... 161/70 |
| 3,553,070 A | | 1/1971 | Sparts ..................... 161/160 |
| 3,558,764 A | | 1/1971 | Isaacson et al. ............ 264/210 |
| 3,562,369 A | | 2/1971 | Chopra et al. .............. 264/41 |
| 3,576,931 A | | 4/1971 | Chopra et al. .............. 264/51 |
| 3,665,918 A | * | 5/1972 | Lindquist et al. ............ 602/75 |
| 3,862,282 A | * | 1/1975 | Watson .................... 264/41 |
| 3,972,328 A | * | 8/1976 | Chen ...................... 128/156 |
| 3,980,513 A | | 9/1976 | Omori et al. ............... 156/244 |
| 4,169,184 A | * | 9/1979 | Pufahl .................... 428/337 |
| 4,368,233 A | | 1/1983 | Barkis et al. .............. 428/245 |
| 4,427,737 A | * | 1/1984 | Cilento et al. ............ 428/315.7 |
| 4,499,210 A | | 2/1985 | Senuma et al. ............. 521/91 |
| 4,518,557 A | | 5/1985 | Wecker ................... 264/45.9 |
| 4,714,735 A | | 12/1987 | Hodgson et al. ............ 524/514 |
| 4,743,499 A | * | 5/1988 | Volke ..................... 428/317.3 |
| 4,767,485 A | | 8/1988 | Michiels ................ 156/244.11 |
| 4,781,774 A | * | 11/1988 | Steward et al. ............. 156/79 |
| 4,816,332 A | | 3/1989 | Fujita et al. .............. 428/304.4 |
| 4,834,741 A | | 5/1989 | Sabee .................... 604/385.2 |
| 5,008,296 A | | 4/1991 | Antoon et al. .............. 521/91 |
| 5,143,679 A | | 9/1992 | Weber et al. ............. 264/288.8 |
| 5,238,968 A | | 8/1993 | Morita et al. ............... 521/79 |

(Continued)

FOREIGN PATENT DOCUMENTS

EP  0 405 227 A2  1/1991

(Continued)

OTHER PUBLICATIONS

Alger, Mark, Polymer Science Dictionary, 1989, Chapman & Hall, 2nd ed., p. 199-200.*

Primary Examiner—Victor Chang
(74) Attorney, Agent, or Firm—Sean J. Edman

(57) ABSTRACT

A continuous method for making porous foam and the foam articles are described. The method allows for tailoring the porosity of the foam by controlling process variables including draw rate and blowing agent concentration. A method for co-extruding the foams with other materials is also described.

6 Claims, 11 Drawing Sheets

U.S. PATENT DOCUMENTS

| | | | |
|---|---|---|---|
| 5,352,513 A | 10/1994 | Mrozinski et al. | 428/315.5 |
| 5,429,856 A | 7/1995 | Krueger et al. | 604/370 |
| 5,431,644 A | 7/1995 | Sipinen et al. | 604/385.2 |
| 5,476,589 A | 12/1995 | Bacino | 210/500.36 |
| 5,599,602 A | 2/1997 | Leonard et al. | 428/56 |
| 5,698,054 A | 12/1997 | Biagioli et al. | 156/145 |
| 5,716,621 A * | 2/1998 | Bello et al. | 424/443 |
| 5,795,834 A | 8/1998 | Deeb et al. | 442/62 |
| 5,804,610 A | 9/1998 | Hamer et al. | 522/182 |
| 5,861,074 A | 1/1999 | Wu | 156/229 |
| 5,885,908 A | 3/1999 | Jaeger et al. | 442/59 |
| 5,905,097 A * | 5/1999 | Walther | 521/139 |
| 6,111,163 A * | 8/2000 | McCormack et al. | 604/367 |

FOREIGN PATENT DOCUMENTS

| | | | |
|---|---|---|---|
| GB | 1100727 | | 1/1968 |
| GB | 1165934 | | 10/1969 |
| GB | 1171971 | | 11/1969 |
| GB | 1 321 489 | | 6/1973 |
| WO | WO-95/16562 | * | 6/1995 |
| WO | WO 97/09167 | | 3/1997 |

* cited by examiner

BREATHABLE POLYMER FOAMS

TECHNICAL FIELD

This invention relates to breathable polymer foams and methods for making the foams.

SUMMARY OF INVENTION

The present invention features polymeric foams that possess a unique porous structure. The invention provides reduced density, porous foams that can be used in a myriad of articles including filtration products, porous membranes, activated carbon filters, receptive ink layers, sponges, and high moisture vapor transmission (MVT) medical backings. The porous foams are made by mixing at least one thermoplastic polymer with at least one blowing agent in a continuous process that includes uniaxially drawing the foam to rupture at least one foam cell as the cell exits a forming or shaping die.

One aspect of the present invention provides a continuous process for producing a breathable foam comprising:

mixing at least one thermoplastic polymer with at least one blowing agent to form a foamable solution, feeding the foamable solution into a shaping orifice, causing the foamable solution to form a foam material having at least one major surface at or about the time it exits the shaping orifice, and uniaxially drawing the foam at a rate such that at least one foam cell ruptures at or about the time the cell exits the shaping orifice, and wherein the resulting foam is porous in a direction perpendicular to a major surface of the foam.

In other aspects of the invention, one or more of the blowing agent concentration, skin thickness, and draw rate can be altered to change the porosity of the foam.

In another aspect of the invention, a material is affixed to the foam by extrusion lamination.

Another aspect of the invention provides a continuous process for making a multi-layer structure containing breathable foam comprising:

mixing at least one thermoplastic polymer with at least one blowing agent to form a foamable solution, separately feeding the foamable solution and one or more additional thermoplastic materials into a shaping orifice whereby the foamable solution forms at least one layer and the additional thermoplastic material forms at least one layer of a multi-layered structure having at least one major surfaces, causing the foamable solution to form a foam at or about the time it exits the shaping orifice, and uniaxially drawing the multi-layered structure at a rate such that at least one foam cell ruptures at or about the time the cell exits the shaping orifice, and wherein the resulting multi-layer structure is porous in a direction perpendicular to a major surface of the multi-layer structure.

Yet another aspect of the invention provides an article comprising a breathable amorphous polymer foam having at least one major surfaces, having at least one ruptured cell, and having porosity in a direction perpendicular to a major surface of the foam.

A further aspect of the invention provides a multi-layer article comprising a breathable thermoplastic elastic porous foam layer.

Other aspects of the invention provide articles with foamed and unfoamed layers and, optionally, laminated surface layers.

The foams of the invention may be made to possess a random array of closed and ruptured cells, the foams preferably having a density reduction of at least 1%. Preferred pore size will depend on the use of the foam. The porosity of the foams can be manipulated by adjusting process conditions such as the draw rate of the foam as it is extruded, melt temperature, die orifice size, concentration and type of blowing agent, total thickness, and skin thickness. The process can yield highly porous foams or nearly occlusive foams depending on the processing conditions used.

As used in this invention:

"breathable" or "porous" means having at least one open channel from an outer major surface through the material to another outer major surface through which air can pass;

"closed-cell" means a foam material having substantially no connection between adjacent cells;

"anisotropic" means having different properties, or degrees of properties, in different directions parallel to a major plane;

"melt temperature" means the temperature of the polymeric material at the exit of the extruder barrel, and near the wall of the extruder barrel;

"melt pressure" means the pressure of the polymeric material at the exit of the extruder barrel and near the wall of the extruder barrel; and "surface layer" or "skin" means the outer layer(s) in a multi-layer construction, typically the term "skin" refers to the A or C layers in an ABA or ABC construction;

"nucleation" means a process by which a homogeneous solution of polymeric material and dissolved molecules of a species undergoes formations of clusters of molecules of the species that define "nucleation sites" from which cells will grow, i.e., it is a change from a homogeneous solution to a multi-phase mixture in which, throughout the polymeric material, sites of aggregation of at least several molecules of gas are formed;

"supercritical fluid" means a gas compressed to the density of a liquid where it can have the salvation characteristics of a liquid, but the viscosity and permeability of a gas; a supercritical fluid is a single phase material that exists above a certain temperature and pressure; the temperature and pressure depend on the gas and are referred to the critical temperature and pressure of the gas; and "melt-bonded" means adhering adjacent polymeric layers by bringing them into contact while both are in a molten state e.g., by extrusion.

An advantage of at least one embodiment of the present invention is the relatively simple manufacturing process used to produce the breathable foams. The foams can be made using standard extrusion equipment. The process could also potentially be operated at high speeds.

Another advantage of at least one embodiment of the present invention is that the process is not limited to a narrow class of polymers. Some processes for making porous materials are limited to specific materials such as polyolefins or low viscosity polymers. The present process can be used with a wide variety of polymers and is not limited to polymers with specific viscosities.

Another advantage of at least one embodiment of the present invention is the ability to control and change the degree of porosity of the foams produced by varying the processing conditions. This allows the properties of the foams to be easily tailored to a particular use.

Another advantage of at least one embodiment of the method of the present invention is that it can eliminate post-processing needed to make foamed or unfoamed films porous.

Another advantage of at least one embodiment of a foam of the present invention is its reduced density. Having a reduced density means that less material is needed to make a foam having the same dimensions as an unfoamed material. Despite the density reduction, good mechanical properties, such as strength, can still be obtained.

Another advantage of at least one embodiment of the foams of the present invention is that they are naturally opaque. When a white, opaque foam is desired, this eliminates the need to add a whitening agent, such as $TiO_2$, which is expensive and can be abrasive.

Another advantage of at least one embodiment of a foam of the present invention is that the porosity or moisture vapor transition rate (MVTR) may be increased during use by stretching the foam material while it is being used. Upon release, the foam can recover to an extent that its porosity or MVTR approach previous values.

Other features and advantages of the invention will be apparent from the following drawings, detailed description, and claims.

DETAILED DESCRIPTION

Figure 1A:
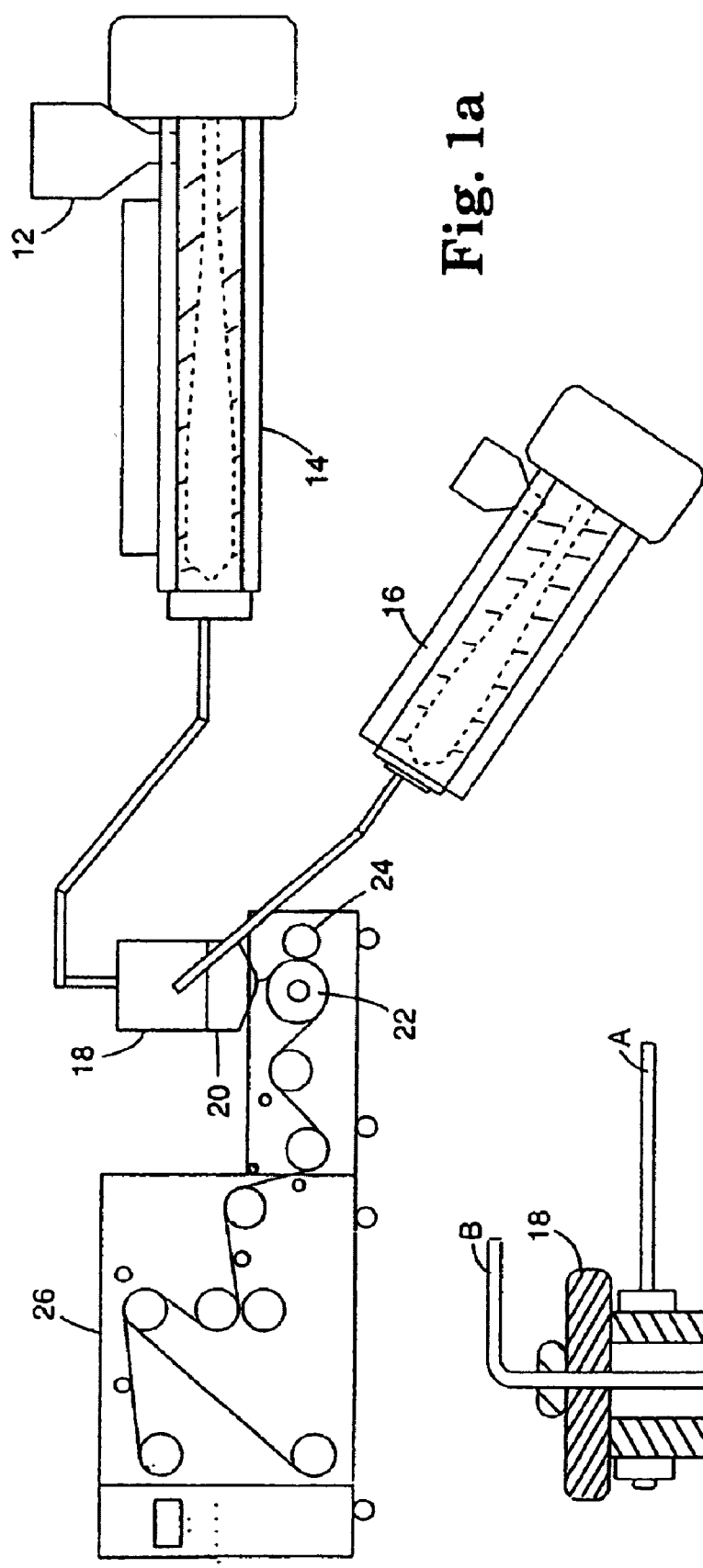
FIG. 1a depicts an extrusion or coextrusion system that can be used for the processes of the present invention.
Figure 1B:
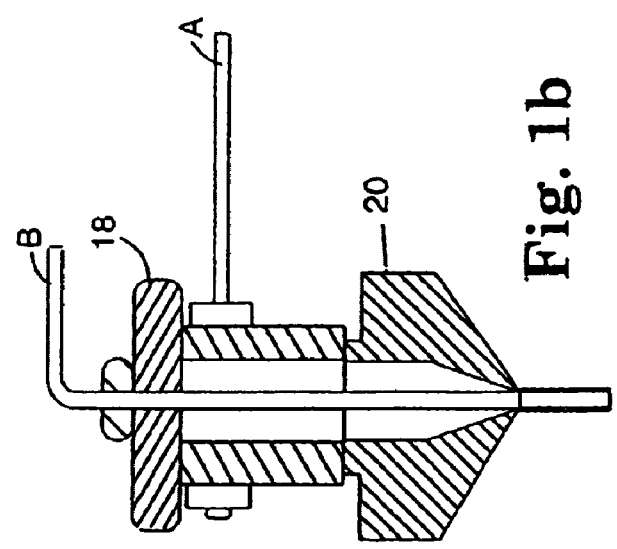
FIG. 1b depicts a typical die that may be used in the process of the invention.
Figure 2A:
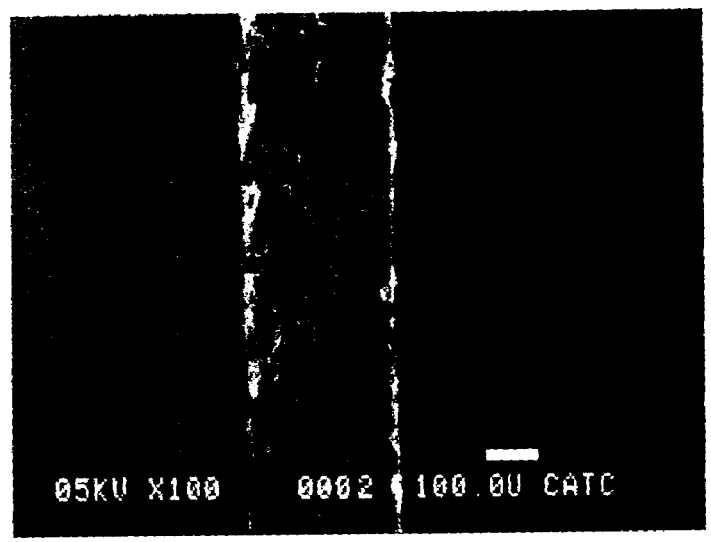
FIGS. 2a, 2b, and 2c show scanning electron microscope (SEM) digital image micrographs of cross sections (viewed in the extrusion direction ("machine direction")) of a single layer foam, a nipped single layer foam, and a two layer coextruded structure, respectively.
Figure 2B:
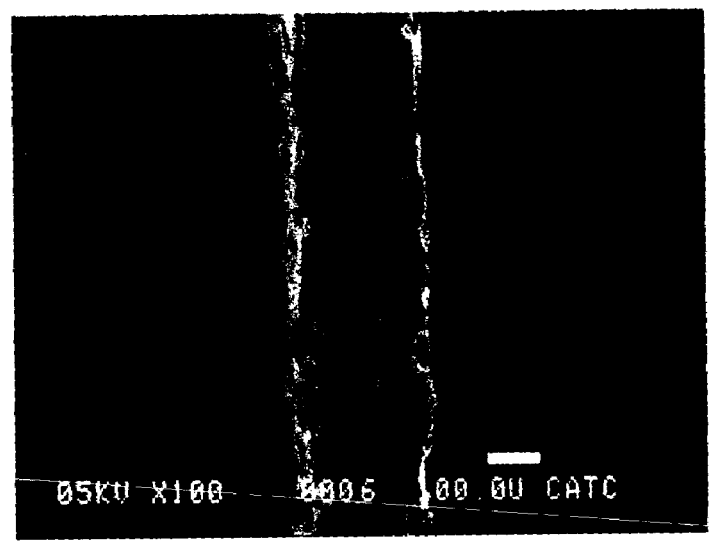
Figure 2C:
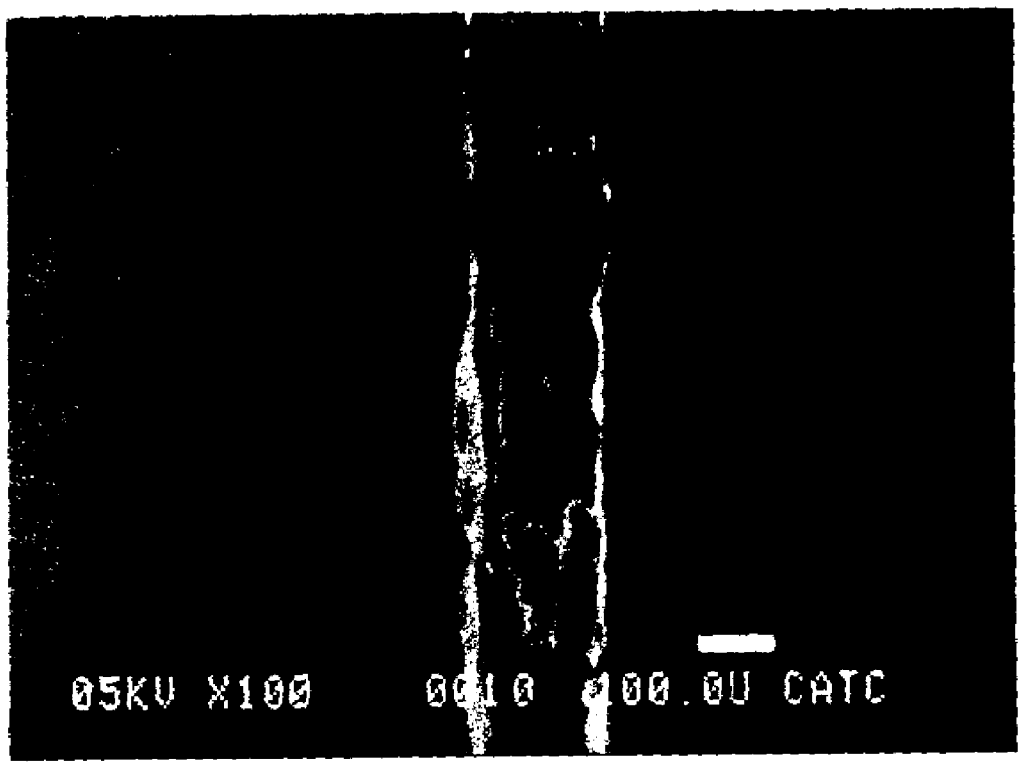
Figure 3A:
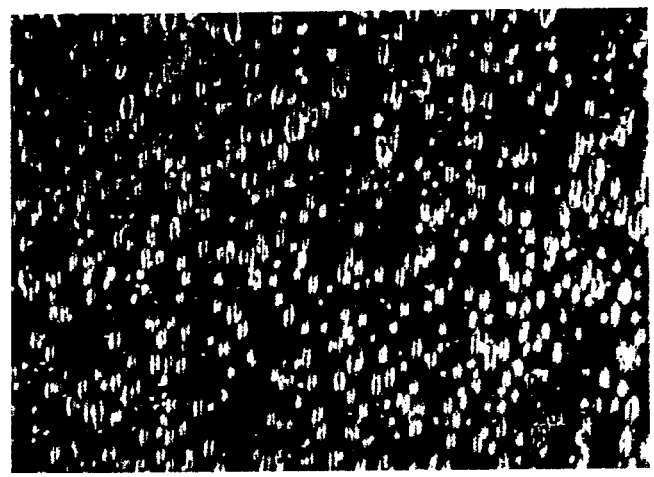
FIGS. 3a, 3b, 3c, 3d, and 3e, respectively, show digital image photographs of a major surface of the foams described in Examples 5 to 9, respectively. Skin thickness increases progressively from FIGS. 3a to 3e.
Figure 3B:
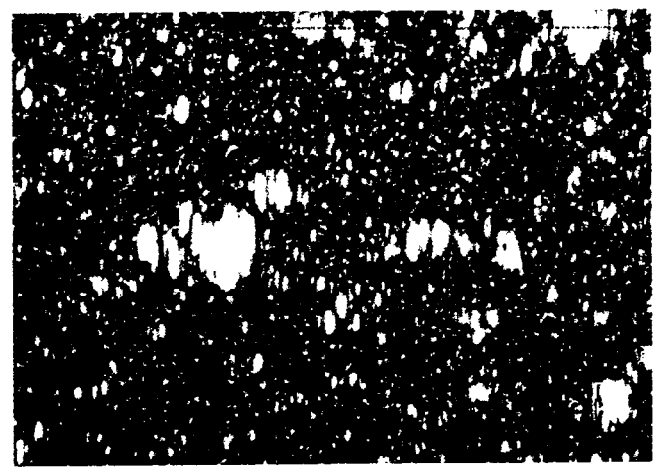
Figure 3C:
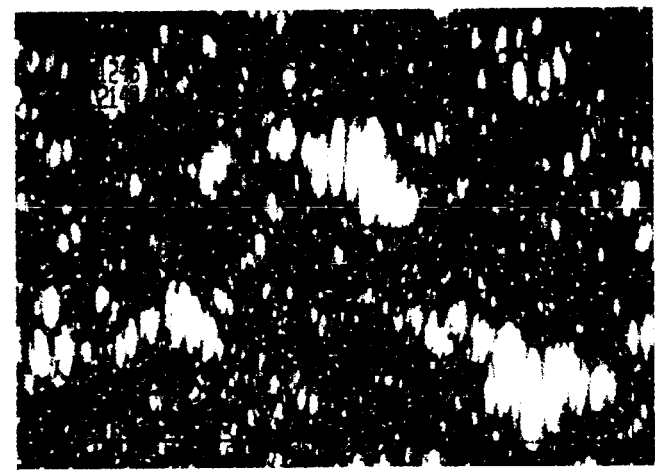
Figure 3D:
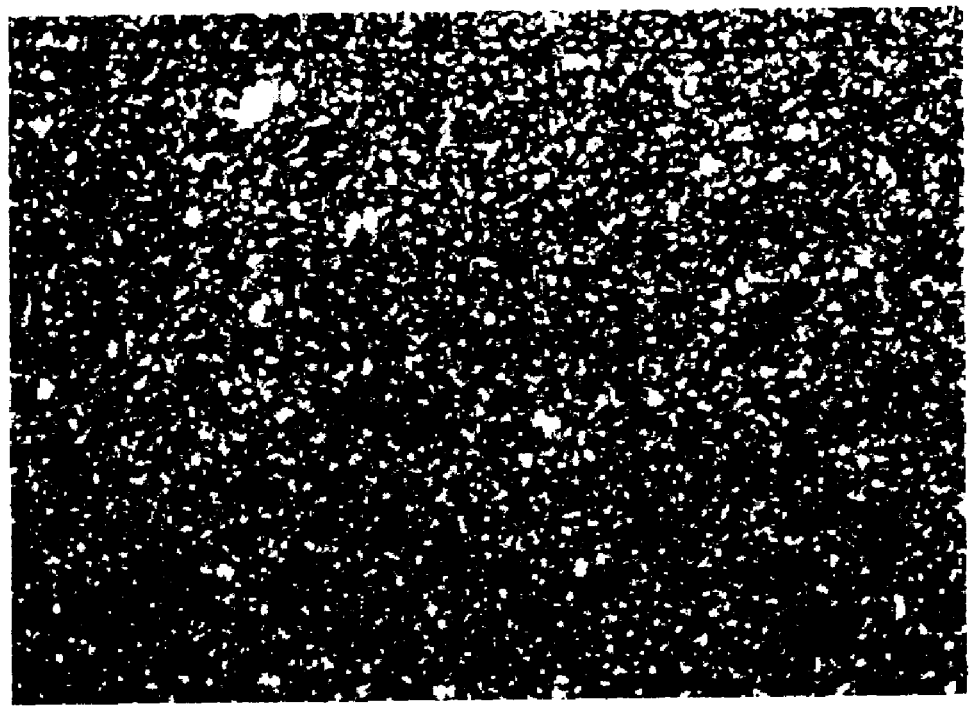
Figure 3E:
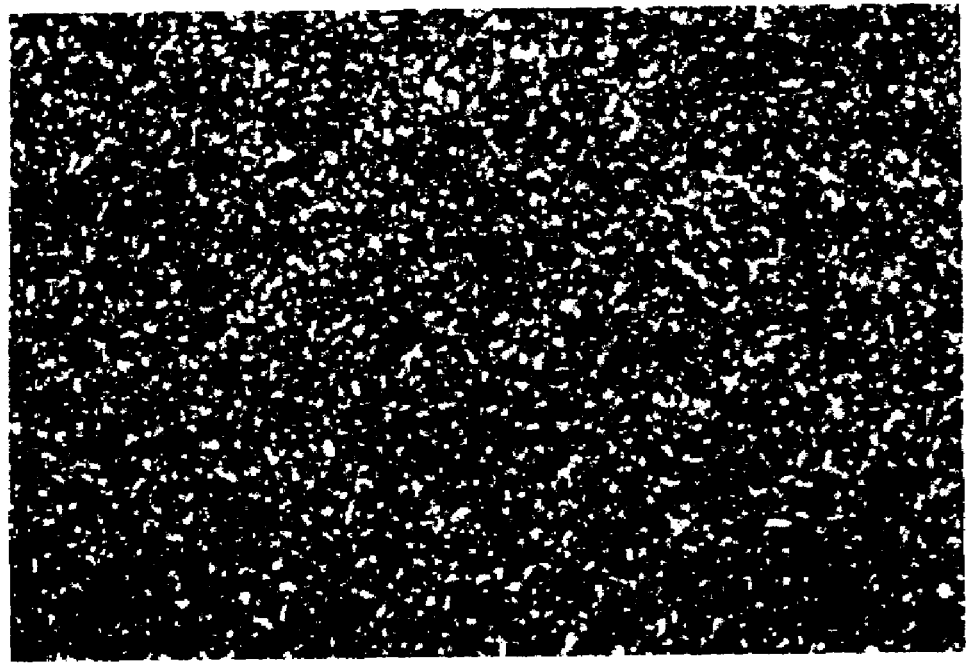

The present invention provides porous thermoplastic foams and methods for making the foams.

Extrusion Process

The foams of the present invention may be made using standard extrusion equipment, such as a single screw extruder, a twin screw extruder, or a tandem extruder system, and combinations thereof. The polymeric material used to make the foam is introduced into the initial zone of the extruder. Additives are typically blended with the polymer, but may be added downstream. If a chemical blowing agent is used, it may also be added at this time. If a physical blowing agent is used, it is typically added after the polymer is melted. The extruder melts and conveys the polymer material while mixing it with the blowing agent to form a foamable melt mixture.

Typically, at the exit of the extruder system the foamable melt mixture is fed into a forming or shaping die. The die may be, for example, profile, annular, flat film, etc. When an annular die is used, the foam may be ruptured and bi-axially oriented by passing it over a mandrel located at the die exit. A multi-layer feed block or multi-layer die may be used if it is desired to make multi-layered constructions by coextrusion. For example, a three-layer feedblock may be used to extrude the foam as the B layer in an ABA or ABC construction. The A or C layers may be foamed or unfoamed and may comprise the same material as the B layer or different polymeric material. In such a case, the A or C layer material may be melted, conveyed, and processed in a separate extruder and is fed to the three-layer feedblock to be coextruded with the foam material. An article having more than three layers may also be made.

The polymeric foam material, and any coextruded materials, is typically passed through a die onto a casting surface such as a rotating casting drum, a moving web, or other suitable surfaces. Throughout the extrusion process, until the foamable melt mixture approaches or reaches the die exit, it is preferably kept under sufficient pressure to keep the blowing agent in solution. The size of the die gap can affect the pressure in the extruder as well as determine the thickness of the resulting foam. As the melt mixture approaches and exits the outer orifice of the die, it is exposed to a reduced pressure, typically ambient pressure. This pressure drop causes a physical blowing agent, or the gas produced by the decomposition of a chemical blowing agent, to expand resulting in nucleation and cell formation. At or about the same time that the cells form, a uniaxial, longitudinal force is applied to the foaming or foamed material to cause one or more of the cells to rupture. The longitudinal force is applied in a direction parallel to the extrusion (machine) direction. It is typically controlled by adjusting the draw rate. This can be done, for example, by adjusting the rotation speed of a casting drum onto which the foam is extruded. However, any means of applying a longitudinal force to the foam could be used.

The foam may be quenched by extruding onto a temperature-controlled surface such as a casting drum. The longitudinal force is applied before quenching begins. If the foam is quenched too quickly, e.g., by placing the die too close to the temperature-controlled surface, the foam will solidify too quickly. This could cause the foam to tear upon application of the drawing force rather than causing cell rupture. The longitudinal force continues to be applied to the foam as it contacts the temperature-controlled surface.

The number of cells that rupture can depend on such factors as the draw rate, blowing agent concentration, quench rate, melt temperature, melt pressure, polymer flow rate, total foam thickness, and skin thickness. The properties of the polymeric materials used, including viscosity, are also factors. Other variables such as die angle, temperature of casting drum, and cross-sectional area of die opening, can also affect the number of cells ruptured.

The uniaxial drawing of the foam can orient the foam such that it has anisotropic properties. For example, a foam of the present invention may be significantly more elastic in the cross-web direction than in the machine direction.

Coextrusion

As previously mentioned, the coextrusion process of the present invention may be used to make a foam material comprising two layers or more, joined together by melt-bonding. A layered material or article may be produced by equipping the extruder die with an appropriate feedblock, e.g., a multi-layer feedblock, or by using a multi-layer die. Multi-layer feedblocks and 3-layer dies are available, for example, from Cloeren Company, Orange, Tex.

Many different embodiments of multi-layer foams may be made by the method of the present invention. Materials or articles having multiple adjacent foam layers may be made with foam layers comprising the same or different materials. The foams of the present invention may comprise one or more interior and/or exterior layer(s) of a multi-layer construction. For example, every other layer may comprise a foam layer, or foam layers may be adjacent: or multiple nonfoam layers may be adjacent to each other. Each foamable, extrudable melt mixture may be processed using the above-described extrusion method wherein the different melt mixtures are fed to different inlets on a multi-layer feedblock which feeds the melt mixtures together in layers prior to exiting the die. The layers should foam in the same manner as described above for the extrusion process. The coextrusion process can also be used to extrude a foam of this invention with other types of materials such as unfoamed polymeric materials. When a multi-layer article is produced, it is preferable to form adjacent layers using materials having similar viscosities.

Figure 4A:
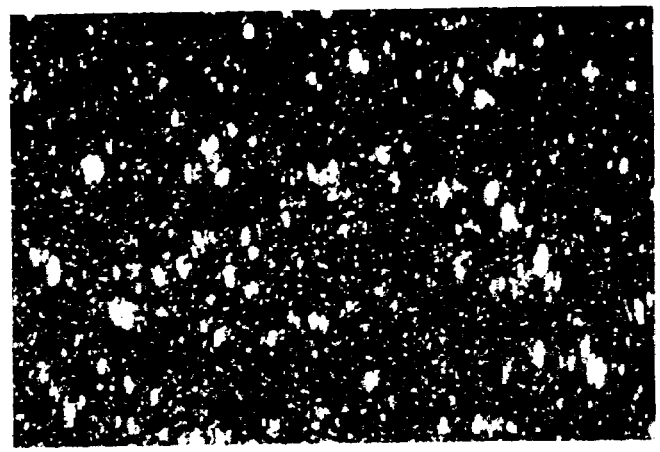
FIGS. 4a, 4b, 4c, and 4d, respectively, show digital image photographs of a major surface of the foams described in Examples 10 to 13, respectively. The blowing agent concentration increased progressively from 4a to 4c, 4d used a different type of blowing agent.
Figure 4B:
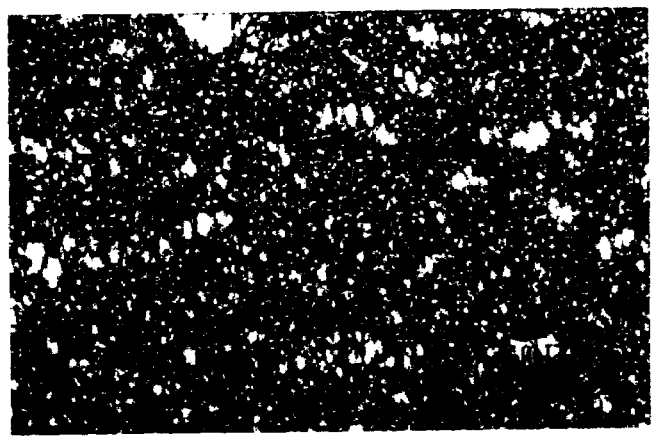
Figure 4C:
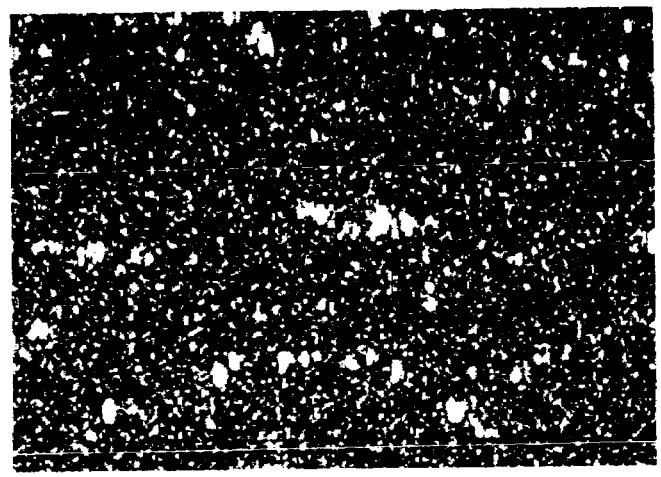
Figure 4D:
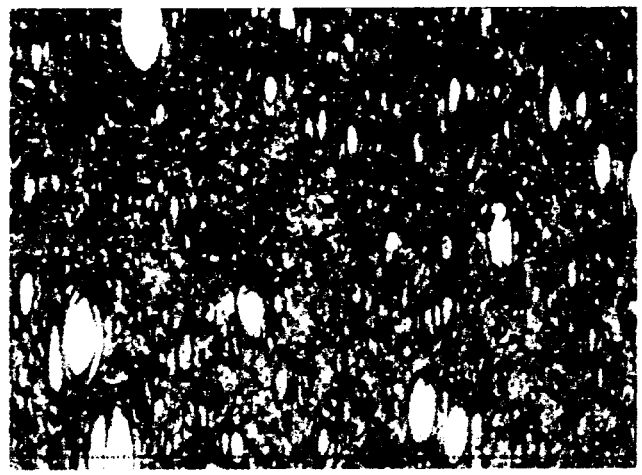
Figure 5A:
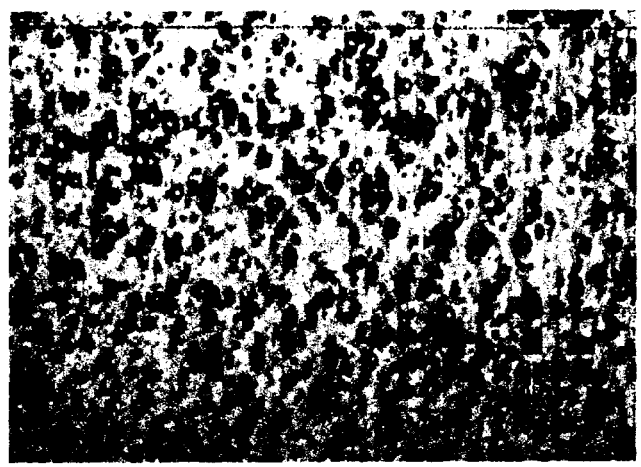
FIGS. 5a, 5b, and 5c, respectively, show digital image photographs of a major surface of the foams described in Examples 26 to 28, respectively. The draw rate increased progressively from 5a to 5c.
Figure 5B:
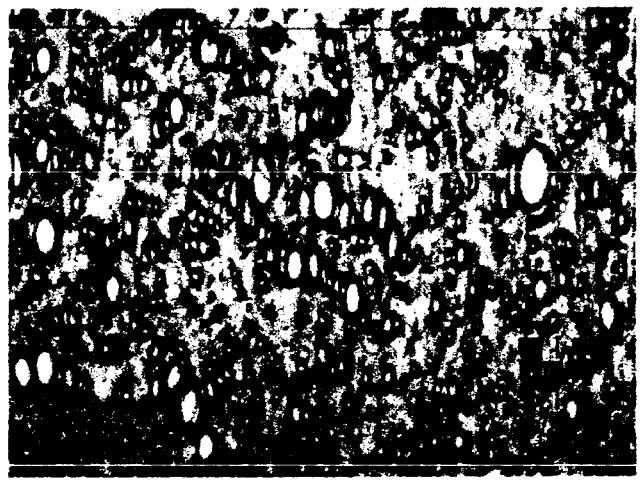
Figure 5C:
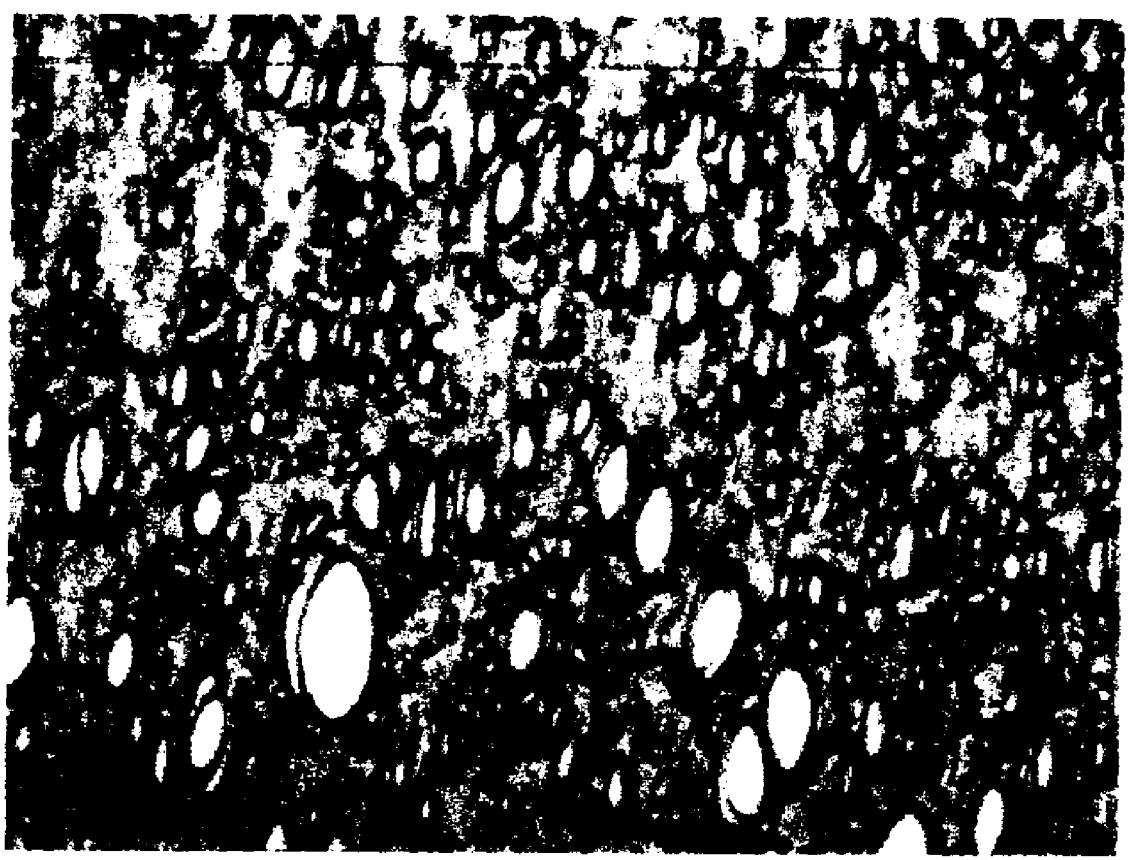
Figure 6:
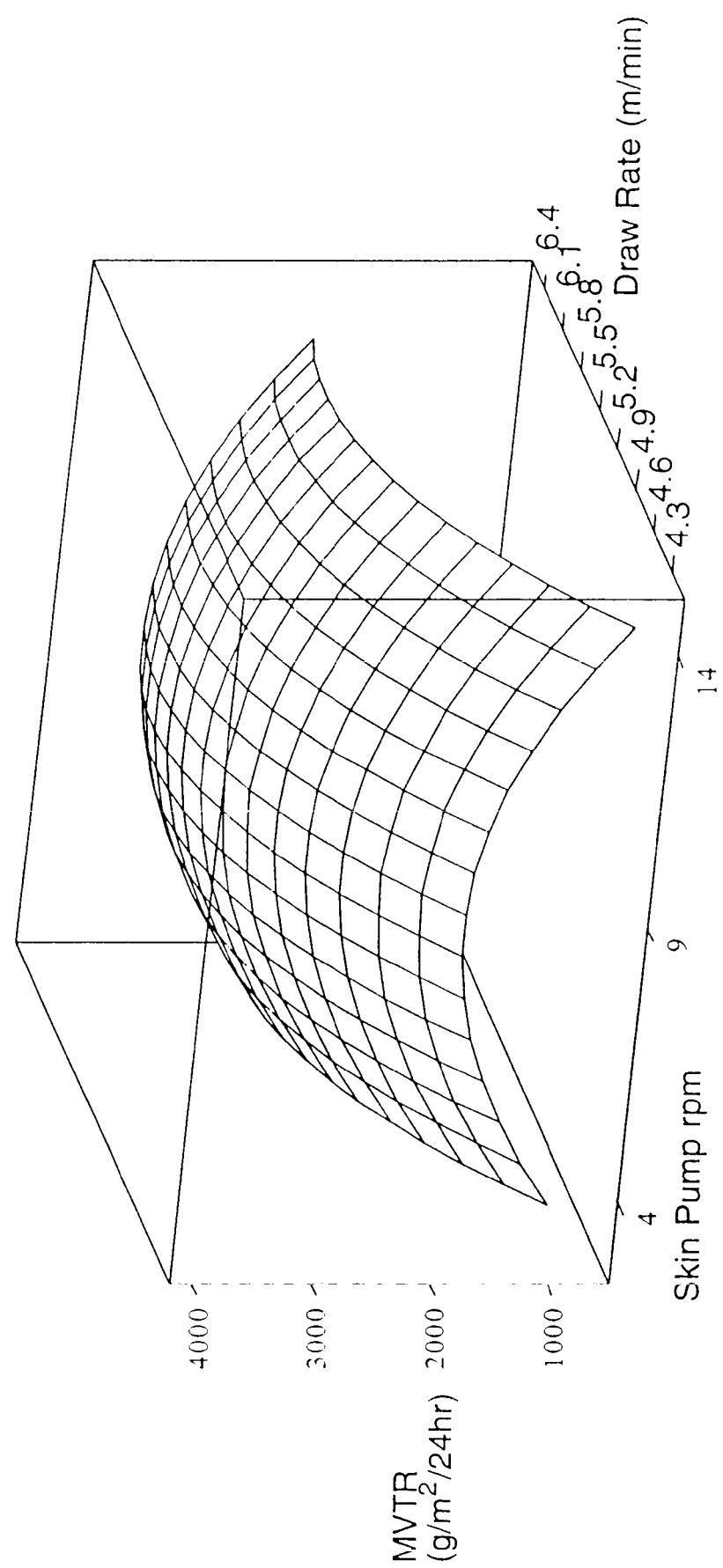
FIG. 6 illustrates moisture vapor transmission rates for ABA coextruded structures of the invention that were made using different draw rates and polymer flow rates.
Figure 7:
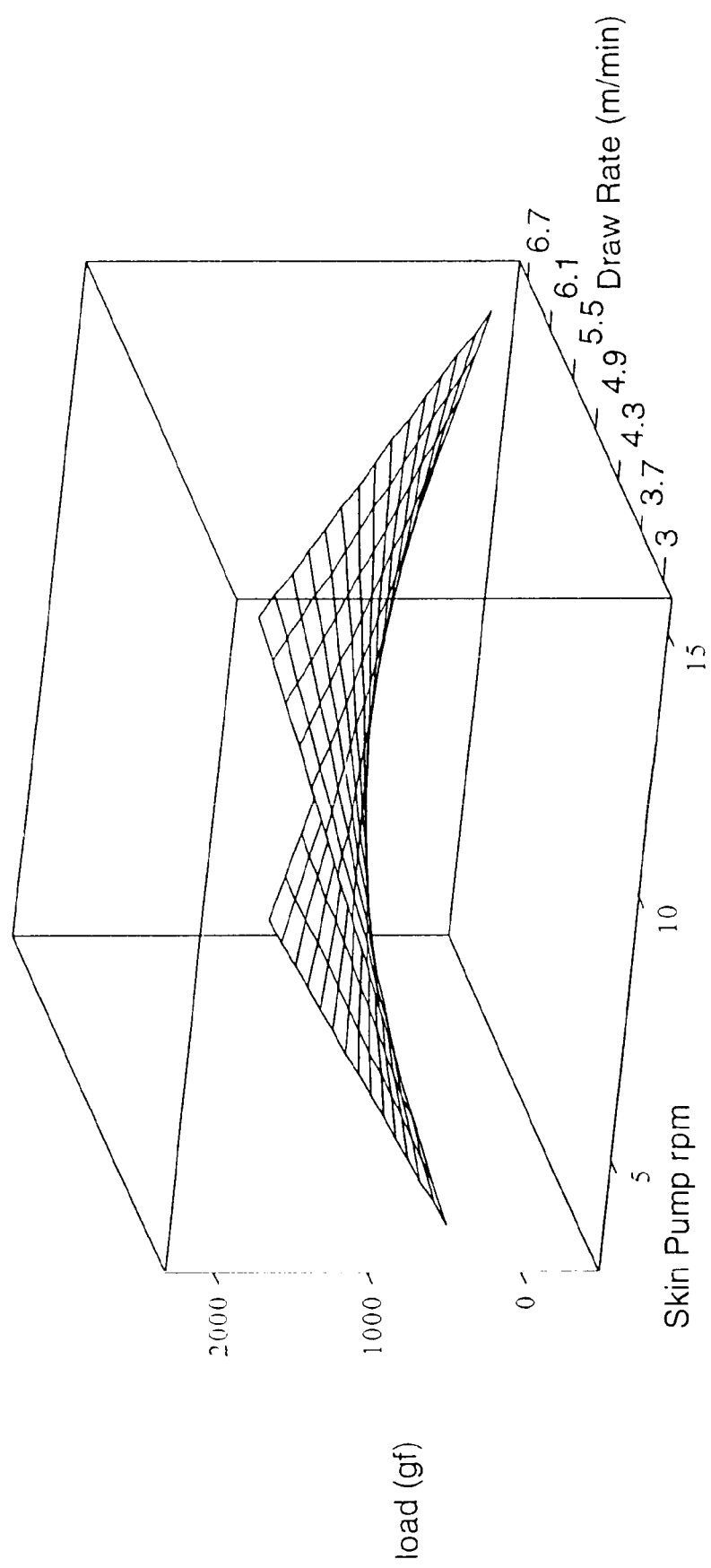
FIG. 7 illustrates tensile load at 200% strain, in the direction parallel to the machine direction, for ABA coextruded structures of the invention made using different draw rates and polymer flow rates.
Figure 8:
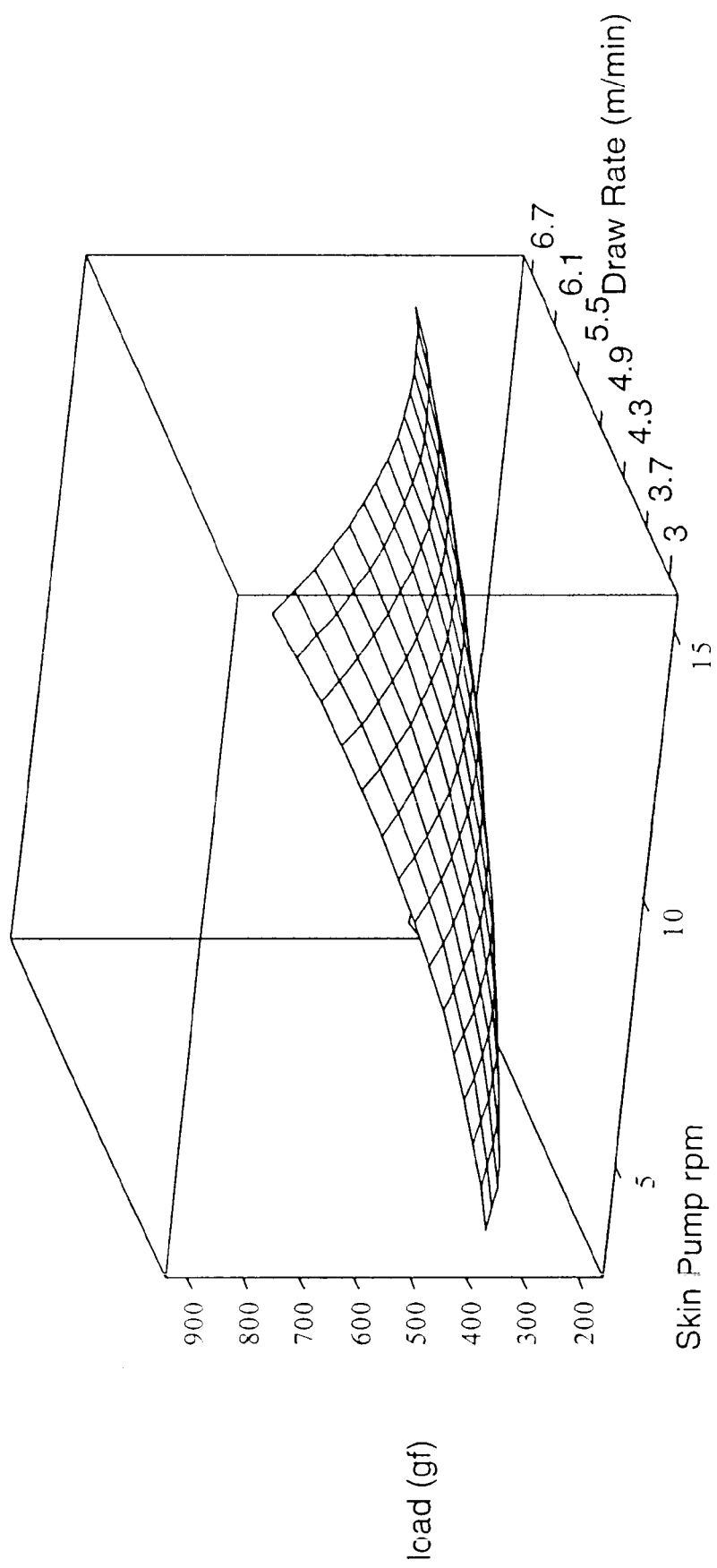
FIG. 8 illustrates tensile load at 200% strain, in the cross-web direction, for ABA coextruded structures of the invention made using different draw rates and polymer flow rates.

If adjacent layers of materials are heated to substantially different temperatures, a die can be used that thermally isolates the different materials until just prior to their exiting the die (e.g., FIG. 4 of U.S. Pat. No. 5,599,602 incorporated by reference). This can diminish or eliminate negative effects of contacting materials having different temperatures such as melting or collapsing the foam or causing continued cell expansion.

Lamination

Multi-layer foam articles can also be prepared by affixing polymer or nonpolymer layers to a single or multi-layer film described above. The layers may be affixed by lamination. Suitable lamination techniques include, for example, post-production lamination, which is well known in the art, or extrusion lamination.

Materials suitable for lamination include barrier materials such as non-porous semi-crystalline polymers that are generally impervious to gases and liquids, e.g., semi-crystalline polyolefins; release materials such as materials having lower surface energies than materials with which they are contacted, e.g., silicones and fluoropolymers; woven materials such as cottons, scrims, and cloths; nonwoven materials such as polypropylenes and polyesters; and pressure sensitive adhesive materials such as polyacrylate copolymers and tackified styrenic copolymers.

In the context of the present invention, extrusion lamination is a method of laminating a material to a foam material during the extrusion process. The laminate material is brought into contact with the foam while the polymeric material comprising the foam is still sufficiently soft, tacky, and/or conformable to adhere to the laminate material. Methods of extrusion laminating a fibrous web, such as a nonwoven or woven material, to an unfoamed polymer material are described in U.S. Pat. Nos. 5,698,054 and 5,795,834, both incorporated by reference. A laminated fibrous web may be elastic, or may be inelastic and extensible.

After the foam articles are made, their properties may be further manipulated by the application of different types of forces. For example, post-production stretching can increase the MVTR of a foam of the invention. Post-production stretching, or "activation," may comprise stretching a foam in one or more directions after it has cooled to ambient temperature. Post-production stretching may be performed on single layer foams, multi-layer foams, and foams laminated with other materials, including fibrous materials.

Several techniques are known in the art whereby an inelastic fibrous web laminated to an elastic film is "activated," i.e., made elastic. U.S. Pat. No. 5,861,074, incorporated by reference, discloses several ways to stretch a laminate in both the machine and cross web directions to improve or impart elasticity. U.S. Pat. No. 4,834,741, incorporated by reference, discloses a composite laminate that has been passed through a pair of cooperating corrugating or pleating rolls to activate the composite laminate. U.S. Pat. No. 5,143,679 incorporated by reference, describes a method and apparatus for incrementally stretching "zero strain" stretch laminate webs to impart elasticity in the direction of initial stretching.

When the fibrous web is inelastic and extensible, the composite laminate is generally inelastic when initially stretched. To impart or increase the elasticity of the laminate, a "preactivation" step can be employed. A preactivation step is broadly defined as an operation performed on the fibrous web and/or the composite laminate to generally weaken the strength and/or to inelastically deform the fibrous web or composite laminate in one or more directions allowing the composite laminate to be more easily stretched. Preactivation is typically followed by substantial elastic recovery of the composite laminate to its original length. The recovery may be at least 50% preferably at least 75%, and most preferably at least 90%.

Process Variables

The inventors found that process variables may be manipulated to achieve desired porosity and density in the resulting foams. These properties can be influenced by altering such variables as the rate at which the foaming or foamed material is drawn as it is extruded, altering the blowing agent concentration in the foam, altering the rate at which the foam material is quenched, changing the die orifice width to affect melt pressure, and altering the melt temperature. When the foam is coextruded with skin layers, the thickness of the skins can also affect the properties of the resulting article.

Draw Rate

The inventors found that the rate at which the forming or formed foam material is drawn as it is extruded can influence the number of, and degree to which, cells of the foam material rupture. A higher draw rate can cause more cells to rupture and can cause the ruptured openings to be large, either of which can cause increased porosity. The draw rate should not be so high that it causes the foam material to tear. The appropriate draw rate to achieve a desired level of porosity can be influenced by the types of materials used, the flow rates of the extrudate, and the cross-sectional area of the die. Draw rate may be controlled by, for example, adjusting the revolutions per minute of a roll onto which the extrudate is cast.

Blowing Agent Concentration

The inventors also found that the amount of blowing agent in the foamable melt mixture can influence the number of cells formed A higher concentration of blowing agent will typically cause more and smaller cells to form. This is believed to be because more blowing agent can provide more nucleation sites. The effect of blowing agent concentration can operate in concert with the effect of melt temperature and melt pressure. Generally, as melt temperature decreases, pore size tends to decrease. Also, generally, as melt pressure increases, pore size tends to decrease.

Skin Thickness

The inventors further found that they could make surprisingly breathable foam articles having unfoamed skin layers. The thickness of the skin layers in a multi-layer article comprising a core layer of a foam of the present invention can affect the porosity of the resulting article. Generally, thethinner the skin layer, the more porous the article can be.

Thin skins provide relatively little resistance to cell rupture. When a cell ruptures, the area of thin skin in contact with, or near, the rupturing cell(s) may also easily rupture. Thicker skin layers may be desirable in some instances because, depending on the material used, a thicker skin can enhance desired adhesion when the foam is laminated, can enhance the tensile strength of an article, and can prevent blocking. i.e., undesired cohesion or adhesion, on the casting surface or the product roll. It is also possible, using the method of the present invention, to provide an article having two or more layers, which article has two parallel major surfaces, with a thick skin, that cannot be ruptured, on one side of a the article and a thin skin, that can be ruptured, on the other side of the article.

Quench Rate

The quench rate is the rate at which the foam material cools at or about the time it exits the die. If it cools rapidly, the foam will quickly solidifies. This prevents cells from further forming. If the foam cools slowly, the cells will have more time to continue to grow and rupture before the foam solidify. The foam may be cooled by ambient air, the application of cold air, or, most typically, by changing the temperature of the surface onto which the foam is extruded. The lower the temperature of the foam when it exits the die, the faster it will solidify. Quench rate is also affected by the distance between the die exit and the casting surface. If cooled too quickly, cells may not rupture, and instead, the foam may tear as it is drawn.

Other Variables

Other variables that may affect the properties of the resulting foam include the cross-sectional area of the die opening, die angle, the temperature of the surface (or skin) layer material, polymer flow rate, and the viscoelastic properties of the polymeric materials. Although no specific rheological properties are required for the polymeric materials used, rheology may be a factor in determining the draw rate needed to rupture the foam cells. Accordingly, polymer viscosity is a variable that may be manipulated to achieve desired foam properties. Viscosity can also be altered by the amount of blowing agent used.

Polymer Materials

Generally the foams of the invention can be made with any thermoplastic material. Thermoplastic materials are those that flow when heated. The thermoplastic materials of the present invention may be semi-crystalline or amorphous. The amorphous materials of the present invention may be thermoplastic elastomers or elastomers. Thermoplastic elastomers are thermoplastic materials that are amorphous above their glass transition temperature and have physical crosslinking. Elastomers are thermopalstic materials that are amorphous above their glass transition temperature and have substantially no physical crosslinking. The elastomeric materials of the present invention may be pressure sensitive adhesives. Pressure sensitive adhesives may be self-tacky or may be materials that become tacky upon the addition of tackifying resins or rosins. An accepted quantitative description of a pressure sensitive adhesive is given by the Dahlquist criteria (as described in Satas. D. (ed.), *Handbook of Pressure Sensitive Adhesive Technology*, p. 171–76 ($2^{nd}$ Ed., Van Nostrand Reinhold, N.Y., 1989). A particularly useful amorphous thermoplastic material is one having a glass transition temperature below 22° C., preferably below 0° C.

Suitable semi-crystalline polymers include semi-crystalline polyesters, such as polyethylene terephthalate, semi-crystalline polyamides, polyimides such as Nylon 6 and Nylon 66, polyolefins such as polyethylene and polypropylene, polymethylpentene, polyisobutylene, polyolefin copolymers, polyester copolymers, fluoropolymers, poly vinyl acetate, poly vinyl alcohol, polyethylene oxide, functionalized polyolefins, ethylene vinyl acetate copolymers, metal neutralized polyolefin ionomers available under the trade designation SURLYN from E.I. DuPont de Nemours, Wilmington, Del., polyvinylidene fluoride, and polytetrafluoroethylene.

Suitable amorphous thermoplastic materials include, for example, polycarbonates, polyacrylics, polymethacrylics, polybutadiene, polyisoprene, polychloroprene, random and block copolymers of styrene and dienes (e.g., styrene-butadiene rubber (SBR)), butyl rubber, ethylene-propylene-diene monomer rubber, natural rubber, ethylene-propylene rubber, and mixtures thereof. Other examples of suitable polymers include, e.g., polystyrene polyethylene copolymers, polyvinylcyclohexane, polyacrylonitrile, polyvinyl chloride, thermoplastic polyurethanes, aromatic epoxies, amorphous polyesters, amorphous polyamides, acrylonitrile-butadiene-styrene (ABS) copolymers, polyphenylene oxide alloys, high impact polystyrene, polystyrene copolymers, fluorinated elastomers, polydimethyl siloxane, polyetherimides, methacrylic acid-polyethylene copolymers, impact-modified polyolefins, amorphous fluoropolymers, amorphous polyolefins, polyphenylene oxide, polyphenylene oxide—polystyrene alloys, and mixtures thereof.

Amorphous thermoplastic elastomers may be preferred materials for the foams if the use of the foam requires elastic properties. Suitable thermoplastic elastomers include, e.g., styrene-isoprene block copolymers, styrene-ethylene/butylene-styrene block copolymers (SEBS), styrene-ethylene-propylene-styrene block copolymers, styrene-isoprene-styrene block copolymers (SIS), styrene-butadiene-styrene (SBS) block copolymers, ethylene-propylene copolymers, styrene-ethylene copolymers, polyetheresters, and poly-α-olefin based thermoplastic elastomeric materials such as those represented by the formula —$(CH_2CHR)_x$ where R is an alkyl group containing 2 to 10 carbon atoms and poly-α-olefin based on metallocene catalysts, and mixtures thereof.

Suitable pressure sensitive adhesive polymers or elastomer polymers that can be compounded with tackifiers include, for example, acrylics, acrylic copolymers (e.g., isooctylacrylate-acrylic acid), amorphous poly-alpha-olefins (e.g., polyoctene, polyhexene, and atactic polypropylene), block copolymer-based adhesives, natural and synthetic rubbers, styrene-butadiene rubber (SBR) silicone adhesives, ethylene-vinyl acetate, siloxanes and epoxy-containing structural adhesive blends (e.g., epoxy-acrylate and epoxy-polyester blends) acrylic copolymers such as those described in U.S. Pat. No. 5,804,610, incorporated by reference, tackified styrenic block copolymers, polyolefin copolymers, polyureas, polyurethanes, vinyl ethers, polyisobutylene/butyl rubber, ethylene-propylene copolymers, ethylene-propylene-diene rubber copolymers, as well as pressure sensitive adhesives disclosed in copending application Ser. No. 09/091,683, incorporated by reference, and mixtures of any of the foregoing pressure sensitive adhesives.

Mixtures of any of these materials may also be used.

Blowing Agents

Physical or chemical blowing agents may be used for the present invention.

A physical blowing agent useful in the present invention is any naturally occurring atmospheric material which is a vapor at the temperature and pressure at which the foam exits the die. The physical blowing agent may be introduced into the polymeric material as a gas, liquid, or supercritical fluid, preferably as a liquid. The physical blowing agent may be injected into the extruder system. A physical blowing agent is usually in a supercritical state at the conditions existing in the extruder during the process. If a physical blowing agent is used, it is preferable that it is soluble in the polymeric material being used. The physical blowing agents used will depend on the properties sought in the resulting foam articles. Other factors considered in choosing a blowing agent are its toxicity, vapor pressure profile, and ease of handling. Flammable blowing agents such as pentane, butane and other organic materials, such as hydrofluorocarbons (HFC) and hydrochlorofluorocarbons (HCFC) may be used, but non-flammable, non-toxic, non-ozone depleting blowing agents are preferred because they are easier to use, e.g., fewer environmental and safety concerns. Suitable physical blowing agents include, for example, carbon dioxide, nitrogen, $SF_6$, nitrous oxide, perfluorinated fluids, such as $C_2F_6$, argon, helium, noble gases, such as xenon, air (nitrogen and oxygen blend), and blends of these materials, hydrofluorocarbons (HFC) and hydrochlorofluorocarbons (HCFC).

Chemical blowing agents are preferred for use in the invention because they do not require an injection system as does a physical blowing agent; they can be used in virtually any extrusion system. Suitable chemical blowing agents include, for example, sodium bicarbonate and citric acid blend, dinitrosopentamethylenetetramine, p-toluenesulfonyl hydrazide 4-4'-oxybis(benzenesulfonyl hydrazide, azodicarbonamide (1,1'-azobisformamide), meta-modified azodicarbonides, p-toluenesulfonyl semicarbazide, 5-phenyltetrazole, 5-phenyltetrazole analogues, diisopropylhydrazodicarboxylate, 5-phenyl-3,6-dihydro-1,3,4-oxadiazin-2-one, and sodium borohydride. Additional chemical blowing agents are described in Klempner, D, Frisch, K. C. (editors). *Handbook of Polymeric Foams and Foam Technology*, Chapter 17 (Hansen, N.Y., 1991).

Coextrudable Materials

The foamable materials can be coextruded with other materials and may comprise any one or more layers of a multi-layer structure including surface layers or interior layers. Coextruding the foams with other materials may be desired to enhance or alter the properties of an article that would otherwise be comprised only of a foam. For example, it may be desirable to increase the ease of handling the foam, reduce blocking on the casting drum and product roll, or change the mechanical or adhesive properties of the resulting foam materials. These objectives can be achieved, for example, by extruding the foam in an ABA construction with the foam as the core B layer and another material as the skin A layers. Or they may be achieved by adding any number of layers comprised of different materials, each of which may provide one or more desired properties to the foam article(s).

The coextruded materials may or may not be foamed. Suitable coextrudable materials include any polymeric material that can be used in an extrusion process. This would include any of the thermoplastic, semi-crystalline amorphous, thermoplastic elastomeric, elastomeric, and adhesive materials described herein. When the core foam layer is elastic, it may be preferred to use semi-crystalline thermoplastic materials for the skin layers, more preferably thermoplastic olefins, because semi-crystalline materials can provide strength and make the foam easier to handle.

The preferred thickness of any coextruded layer can depend on the intended use of the foam article and the properties of the foam and coextruded materials. For example, in making a breathable foam article, the coextruded materials should not be so thick that they prevent rupturing of foam cells or fail to rupture when foam cells rupture and thus prevent the article from being porous. In general, to obtain a porous article, any material coextruded with the foam core must be able to be ruptured, although the degree of rupture needed will again depend on the intended use of the article. To provide an article with two parallel major surfaces where one surface and, optionally, adjacent interior layers, has, or have, open pores and the other surface acts as a barrier, a skin layer can be extruded at a thickness that prevents rupture of the skin layer when the underlying foam cells rupture.

Additives

The foamable melt mix may also include additives. Examples of suitable additives include tackifiers (e.g., rosin esters, terpenes, phenols, and aliphatic, aromatic, or mixtures of aliphatic and aromatic synthetic hydrocarbon resins), plasticizers (other than physical blowing agents), nucleating agents (e.g., talc, silicon, or $TiO_2$), pigments, dyes, reinforcing agents, solid fillers, hydrophobic or hydrophilic silica, calcium carbonate, toughening agents, flame retardants, antioxidants, expandable microspheres, glass beads, stablizers (e.g., UV stabilizers), and combinations thereof. The additives may be added in amounts sufficient to obtain the desired properties for the foam being produced. The desired properties are largely dictated by the intended application of the foam or foam article.

Articles

The invention features materials and articles that comprise a breathable polymer foam. The foam may be provided in a variety of shapes that will allow cells to rupture upon application of a longitudinal force during the extrusion process. These shapes include a rod, a fibril, a cylinder, a sheet, a tape, etc., depending on the die shape. In some embodiments, e.g., when the foam is provided in the form of a sheet or tube, the foam will have two major surfaces.

The foams of the present invention may be made having a wide range of porosities. The optimum porosity will depend on the intended use of the foam.

The foams of the present invention may also be made having a range of densities, typically from 0.1 to 0.9 grams/cubic centimeter, preferably 0.4 to 0.6 g/cc. These lower densities, as compared to unfoamed materials, allow articles to be made with less material. Even though less material is used, the foam articles can have good mechanical properties, such as tensile characteristics. For example, the tensile strength of a foam, having about half the density of a comparable unfoamed material of the same dimensions, would not necessarily be half that of the unfoamed material.

Due to the uniaxial drawing of the foam materials as they exit the die, the foam materials may be oriented in the machine direction. They may have anisotropic properties, such as tensile and elastic properties, in the machine and cross-web directions. For example, a foam of the invention may be significantly more elastic in the cross-web direction than in the machine direction. The difference may be as much as 5 times.

Multi-layered articles made using the coextrusion process of the invention may have a myriad of different properties depending on the materials used and the porosity of the foams in the articles. A porous foam article with thin outer layers of polymeric material can be made to be highly porous.

After a foam material or article has been formed, it may be subjected to further processing. For example, the foam may be subjected to ultraviolet radiation, an electron beam source, or heat source to crosslink the polymeric materials in the foam. The foam material may also be subjected to post-production orientation, lamination, replication, converting, and thermoforming. The foams may also be coated with blown microfibers, solvent coated, and/or extrusion coated.

The foams of the present invention have proven to be suitable for extrusion lamination, for example with nonwoven materials. These laminated porous foams may be employed beneficially in applications where high moisture vapor transition rates are desired, such as in diapers.

The foams made with elastomeric materials may be stretched during use. This allows one to reversibly change the moisture vapor transition rate of a foam of the present invention during use by stretching and relaxing the foam material as it is being used. When the foams are relaxed after stretching they can recover at least 50% of their increase in porosity or MVTR, preferably at least 70%, and most preferably at least 90%. For example, if a foam's MVTR increases from 100 to 300 g/m$^2$/24 hr upon stretching, upon release the MVTR g/m$^2$/24 hr can recover to under 200 g/m$^2$/24 hr, preferably under 160 g/m$^2$/24 hr, and more preferably under 120. This property could be useful in controlling pressure drop, gas flow, or moisture flow.

EXAMPLES

This invention may be illustrated by way of the following examples.

Test Methods

Optical Microscopy

Optical micrographs were obtained using a Zeiss Stemi microscope (Model SV11) available from Carl Zeiss Inc., Batavia, Ill., and a high performance CCCD camera (Model 4915-2030/0000) available from Cohu Inc., San Diego, Calif., with a light source available as model 8375 from Fostec Inc. Auburn, N.Y. The microscope was operated in the brightfield mode at magnifications of 10×. The micrographs were printed on a Mavigraph Color Video Printer (Model UP1800MD), available from Sony Electronics Inc., San Jose, Calif.

Foam Density (ASTM D792-86)

Foam samples were cut into 12.5 mm×25.4 mm specimens and weighed on a high precision balance available as Model AG245 from Mettler-Toledo, Greifensee, Switzerland. The volume of each sample was obtained by measuring the mass of water displaced at room temperature (25° C.). Assuming the density of water at 25° C. to be 1 g/cm$^3$, the volume of each sample was calculated using Archimede's principle. The density of the foam was obtained by the quotient of the mass and volume. Accuracy of this measurement is ±0.005 g/cm$^3$.

Tensile/Elongation Strength

Tensile strength and elongation in the machine and cross-web direction were determined in the following manner. A 10.2 cm×2.5 cm sample was placed between the jaws of an INSTRON Tensile Tester (Model No. 55R112, Instron Corp., Canton, Mass.) to expose a 5.1 cm gauge length. The crosshead speed was set at 50.8 cm/min. The jaws were drawn apart at 50.8 cm/min until the machine detected a break. Forces at 200% strain were recorded. Tensile strength and elongation were calculated by INSTRON software in grams force and were converted to Newtons.

Stress Decay

Percent Stress Decay was determined in the cross-web direction. A 10.2 cm long by 2.54 cm wide sample was placed between the jaws of an INSTRON Tensile Tester using a 5.1 cm gauge length. The crosshead speed was set at 50.8 cm/min. The jaws were drawn apart at 50.8 cm/min stretching the sample to 100% strain, i.e., 5.1 cm extension, and the load at 100% strain was recorded. This extension was held for 30 additional seconds and the force was again recorded to obtain the force relaxation through the calculation described below. The crosshead returned to zero extension, and the sample was allowed to recover for 60 seconds. The sample was then stretched to 50% strain, i.e., 2.54 cm extension, on the second cycle. The peak load at 50% strain was recorded, then the load was recorded again after holding 50% strain for 4 minutes, to obtain the stress decay value. The calculations completed using the INSTRON Software were as follows:

% Stress Decay=((Initial load@50%–final load after 4 min@50%)/initial load 50%)×100

Two Cycle Hysteresis

Percent Set and Percent Force Relaxation were calculated in the cross-web direction. A 10.2 cm long by 2.54 cm wide sample was placed between the jaws of an INSTRON Tensile Tester to expose a 5.1 cm gauge length. The crosshead speed was set at 50.8 cm/min. The jaws were drawn apart at 50.8 cm/min to 100% strain or 5.1 cm extension. The load was recorded and the extension held for 30 additional seconds at which point the force was again recorded. The crosshead then returned to zero extension, and the sample was allowed to recover for 60 seconds. The sample was pulled to 50% strain or 2.54 cm extension on the second cycle. The point of extension at which a minimum force was reached at the onset of the second cycle was recorded. The calculations completed using the INSTRON Software were as follows:

% Force Relaxation=((Initial load@100%–final load after 30 sec @100%)/initial load @)100%)×100 Set=((cycle 2 extension min force deflection–initial cycle 1 extension)/gauge length)×100

Moisture Vapor Transmission Rate (MVTR)

Moisture vapor transmission rates of the samples were tested using an upright method. Glass jars were filled with approximately 300 mL of water. Two test samples and two control samples were cut into 10.2 cm×10.2 cm samples. Each sample was placed between a rubber o-ring and metal screw cap. Each screw cap, having a 7.5 cm diameter hole was then tightly screwed onto the glass jar thereby holding the sample in place, at the mouth of the jar between the o-ring and screw cap. The jars were weighed on an analytical balance to the nearest 0.01 gram. The jars were held for at least 4 hours at 20° C. and 50% humidity in a control chamber in upright PLEXIGLAS holders with a small circulating fan blowing air across the screw cap opening and exposed sample. The jars were then removed and weighed immediately to the nearest 0.01 gram. Moisture vapor rates were calculated by the change in weight multiplied by the exposed area divided by the time of exposure. Rates are reported in grams per square meter per 24 hours.

| Materials Used | |
|---|---|
| Material | Description |
| VECTOR 4111 | A styrene-isoprene-styrene tri-block copolymer, containing 18% polystrene, available from DexCo, Houston, Texas. |
| VECTOR 4211 | A styrene-isoprene-styrene tri-block copolymer, containing 30% polystyrene, available from DexCo, Houston, Texas. |
| KRATON 6430 | A styrene-isoprene-styrene di-block/tri-block copolymer, containing 30% polystyrene, available from Shell Chemical Co., Houston, Texas. |
| Polystyrene G3 | A polystyrene homopolymer, melt flow index of 3, available from Amoco Chemical Co., Chicago, Illinois. |
| Polystyrene G18 | A polystyrene homopolymer, melt flow index of 18, available from Amoco Chemical Co., Chicago, Illinois. |
| PS207 | A polystyrene homopolymer, melt flow index of 15.5, available from Nova Chemicals, Belpre, Ohio. |
| ENGAGE 8200 | A polyethylene-polyoctene polyolefin random copolymer available from Dow Chemical Co., Midland, Michigan. |

-continued

Materials Used

| Material | Description |
|---|---|
| PF814 | A polypropylene homopolymer, with enhanced melt strength, available from Himont Corp., Salt Lake City, Utah. |
| RIC-50 | A sodium bicarbonate-citric acid chemical blowing agent, precompounded with 50 wt % low molecular weight polyethylene, available from Reedy International Corp., Keyport, New Jersey. |
| Azo 1307H | An azodicarbanamide chemical blowing agent, precompounded with 50 wt % low molecular weight polyethylene, available from Millennium Petrochemicals, Cincinnati, Ohio. |
| PP 7C12N | A polypropylene-polyethylene impact copolymer, melt flow index of 22, available from Union Carbide, Danbury Connecticut. |

Extrusion Coextrusion Process 10

In making an ABA coextruded article, the polymer blend components and chemical blowing agent of the B layer were weighed on a Mettler-Toledo (Geifensee, Switzerland. Model: PM34-K) balance in batches of 7000 g, hand mixed, and added to the extruder hopper 12. Blowing agent concentrations were typically in the range of 0.5 to 6 weight %. The B layer components were melted, mixed, and convened using a 1.25" (3.18 cm) Killion Single Screw Extruder 14 (Pawcatuck, Conn., Model: KTS 125) with a length to diameter ratio of 24:1, and 3 barrel zones. The screw had a Saxton mixing element with a compression ratio of 3:1. An increasing temperature range of about 138 to 216° C. from zone 1 to zone 3 was used to adequately melt all of the polymer components and to decompose the chemical blowing agent. Extruder 14 was primarily operated at flow rates between 4–9 kg/hr creating operating pressures between 1340 and 2965 MPa. The melt temperature and melt pressure of the extrudate were measured by a combination thermocouple/pressure transducer located at the extruder barrel wall near the extruder exit.

The polymeric material in the A layers was fed into a 0.75" (1.27 cm) Killion Single Screw Extruder 16 (Pawcatuck Conn. Model: KTS-075) with a length to diameter ratio of 30:1, and 4 barrel zones. The screw had an Egan mixing element with a compression ratio of 3:1. Extruder 16 was operated at flow rates of up to 2.3 kg/hr with an increasing temperature profile of about 138 to 216° C. from zone 1 to zone 4 creating operating pressures of between 345 and 827 MPa. The flow rate of the A layer was precisely controlled by a 5 cm$^3$/revolution Zenith Melt Pump (not shown) (Parker-Hannifin Corporation Sanford, N.C.) that was located at the exit of extruder 16.

Both the A and B layers were conveyed from their respective extruders to multilayer feedblock 18 using 0.5" (1.27 cm) OD stainless steel tubing. The A and B layers were combined into an ABA arrangement using a three layer Cloeren feedblock 18 (Cloeren Company Orange, Tex. Model: 96-1501) with an ABA selector plug. After the layers were combined in the feedblock the materials were formed into a planar sheet using a 10" (25.4 cm) wide Ultraflex 40 Die 20 (Extrusion Dies Incorporated, Chippawa Falls, Wis.). The die gap was varied, but was typically between 0.05 and 1.0 mm. Feedblock 18 and die 20 were both operated at temperatures of about 177 to 216° C. The ABA construction exited the die and was uniaxially oriented as it was cast onto a temperature-controlled stainless steel casting drum 22, causing the foam cells in the B layer, and adjacent A layer sections to rupture. Drum 22 was maintained at 32° C., and may be 1 mm to 15 centimeters from the die exit. Optionally a pneumatic rubber nip roll 24 was used to control the surface texture of the foam material, or to help bond other lamination materials (e.g., nonwovens) to the ABA construction, as the foam passed into a space, or "nip," defined by the casting drum 22 and nip roll 24. The nip was typically closed so that the casting drum and nip roll were touching until the foam material was fed between the two. However, the nip may be set to a gap greater than or less than the effective thickness of the material passing through the nip, as described in U.S. Pat. No. 3,539,666 (Col. 6), incorporated by reference. The porous foam material then was collected using a Rotary Automation film winder 26.

Single layer foam constructions were made by disengaging extruder 16.

Examples 1–4

Examples 1–4 illustrate the properties of a single layer foam construction of the invention. Principle operating conditions are shown in Table 1. These operating conditions are: type and weight ratio of core materials, the rate at which the core material was extruded, the draw rate, and whether a nip roll was used.

Example 1 was made using the above-described process except extruder 16 was disengaged and only the foam core (B) layer was made. An elastic thermoplastic polymer material comprising VECTOR 4211, Polystyrene G3 and chemical blowing agent RIC-50 in a weight ratio of 85:13:2 was passed through extruder 14 and die 20. The melt was cast at a rate of 6.5 kg/hr from die 20 onto casting drum 22 and drawn at a draw rate of 3.0 meters per minute.

Example 2 was made by the method described in Example 1 except the draw rate was 4.0 meters per minute.

Example 3 was made by the method described in Example 1 except the extruded foam was further cast into a closed gap. i.e., closed nip, between the casting drum 22 and pneumatic nip roll 24.

Example 4 was made by the method described in Example 1 except the chemical blowing agent and material composition ratios were different, as shown in Table 1, and the draw rate was 2.4 m/min.

Foam density, Tensile and Elongation, Stress Decay, Two Cycle Hysteresis and MVTR for examples 1–4 were measured. Results are shown in Table 2. The abbreviations "CD" and "MD" indicate cross-web and machine (down web) directions.

TABLE 1

| Example | Core composition | wt ratio | (kg/hr) | Draw rate (m/min) | Nip |
|---|---|---|---|---|---|
| 1 | VECTOR 4211/PS G3/RIC-50 | 85.0/13.0/2.0 | 6.5 | 3.0 | N |
| 2 | VECTOR 4211/PS G3/RIC-50 | 85.0/13.0/2.0 | 6.5 | 4.0 | N |
| 3 | VECTOR 4211/PS G3/RIC-50 | 85.0/13.0/2.0 | 8.0 | 3.0 | Y |
| 4 | VECTOR 4211/PS G3/Azo | 83.7/13.0/3.3 | 6.8 | 2.4 | N |

TABLE 2

| | Tensile and Elongation | | | | | | Stress Decay | | Two Cycle Hysteresis | | | | |
|---|---|---|---|---|---|---|---|---|---|---|---|---|---|
| | Load @ 100% | | Load @ 200% | | Max Load | | | | | | | | |
| Example | CD (N) | MD (N) | CD (N) | MD (N) | CD (N) | MD (N) | Relax (%) | Decay (%) | Relax (%) | Set (%) | MVTR (g/m²/24 hrs) | Thickness (microns) | Density (g/cc) |
| 1 | 4.1 | 9.5 | 5.6 | 13.2 | 37.7 | 38.8 | 13.4 | 13.3 | 13.4 | 2.3 | 300 | 265 | 0.65 |
| 2 | 2.7 | 7.0 | 3.8 | 9.8 | 16.8 | 17.5 | 22.7 | 13.3 | 13.7 | 2.7 | 1214 | 237 | 0.58 |
| 3 | 2.2 | 6.3 | 3.2 | 9.2 | 11.2 | 12.1 | 15.3 | 15.6 | 12.7 | 2.4 | 1336 | 210 | 0.54 |
| 4 | 4.7 | 11.3 | 6.3 | 15.2 | 30.8 | 38.9 | 16.7 | 16.8 | 16.4 | 6.5 | 636 | 254 | 0.74 |

As seen in Table 2, a porous breathable single layer foam can be made using the process of the invention.

Examples 5–9

Examples 5–9 illustrate the effect on foam properties of varying skin layer thickness. Principle operating conditions are shown in Table 3.

Example 5 was made in the same manner as example 1 except the 1.25" Killion Single Screw Extruder was replaced with a 1.5" Davis-Standard Single Screw Extruder (Model DS15HM. Pawcatuck, Conn.) having a length to diameter ratio of 30:1, 5 barrel zones and a screw with a compression ratio of 3:1 and a Saxton mixing element. The foam was made with an elastic thermoplastic polymeric material comprising VECTOR 4211, Polystyrene G18 and chemical blowing agent RIC-50 in a weight ratio of 86.5:13.0:0.5 as the core material and an inelastic thermoplastic polymeric material (PP 7C12N) as the skin layer on both side of the core layer. The core material exited extruder 14 at a rate of 6.5 kg/hr. The gear pump for the skin layer extruder was operated at 5 rpm. The draw rate was 6.1 meters per min.

Example 6 was made by the method described in Example 5 except the speed of the gear pump for the skin layer extruder was 10 rpm.

Example 7 was made by the method described in Example 5 except the speed of the gear pump for the skin layer extruder was 15 rpm and the ratio of materials was changed slightly, as shown in Table 3.

Example 8 was made by the method described in Example 7 except the speed of the gear pump for the skin layer extruder was 20 rpm.

Example 9 was made by the method described in Example 5 except the speed of the gear pump for the skin layer extruder was 30 rpm and the ratio of materials was changed slightly, as shown in Table 3.

Foam density, Tensile and Elongation, Stress Decay, Two Cycle Hysteresis and MVTR were measured and total skin thickness calculated for examples 5–9. Results are shown in Table 4.

TABLE 3

| | Core | | | Skin | | Draw rate | |
|---|---|---|---|---|---|---|---|
| Example | composition | wt ratio | (kg/hr) | composition | extruder rpm | (m/min) | Nip |
| 5 | VECTOR 4211/PS 618/RIC-50 | 86.5/13.0/0.5 | 6.3 | PP7C12N | 5 | 6.1 | N |
| 6 | VECTOR 4211/PS G18/RIC-50 | 86.5/13.0/0.5 | 6.5 | PP7CI2N | 10 | 6.1 | N |
| 7 | VECTOR 4211/PS G18/RIC-50 | 86.0/13.0/1.0 | 6.9 | PP7C12N | 15 | 6.1 | N |
| 8 | VECTOR 4211/PS G18/RIC-50 | 86.0/13.0/1.0 | 7.1 | PP7C12N | 20 | 6.1 | N |
| 9 | VECTOR 4211/PS G18/RIC-50 | 85.5/13.0/1.5 | 7.4 | PP7C12N | 30 | 6.1 | N |

TABLE 4

| | Tensile and Elongation | | | | | | Stress Decay | | Two Cycle Hysteresis | | | Thickness | | |
|---|---|---|---|---|---|---|---|---|---|---|---|---|---|---|
| | Load @ 100% | | Load @ 200% | | Max Load | | | | | | | | | |
| Example | CD (N) | MD (N) | CD (N) | MD (N) | CD (N) | MD (N) | Relax (%) | Decay (%) | Relax (%) | Set (%) | MVTR (g/m²/24 hrs) | Total (microns) | Skins (%) | Density (g/cc) |
| 5 | 2.1 | 5.2 | 3.0 | 7.4 | 8.6 | 8.8 | 21.2 | 19.3 | 21.4 | 7.7 | 4255 | 159 | 5.1 | 0.60 |
| 6 | 2.9 | 5.9 | 3.8 | 8.2 | 10.8 | 11.4 | 29.0 | 21.4 | 28.7 | 8.8 | 2141 | 153 | 7.9 | 0.57 |
| 7 | 4.1 | 7.3 | 5.2 | 9.8 | 12.4 | 12.7 | 35.0 | 22.2 | 35.7 | 10.6 | 1991 | 156 | 10.7 | 0.59 |
| 8 | 5.5 | 9.0 | 6.8 | 11.6 | 16.0 | 18.1 | 37.8 | 22.5 | 38.3 | 11.2 | 1514 | 155 | 13.4 | 0.63 |
| 9 | 7.1 | 10.9 | 8.5 | 13.7 | 16.4 | 19.3 | 41.6 | 27.1 | 41.8 | 13.6 | 524 | 155 | 19.0 | 0.65 |

As seen in Table 4, increased skin thickness may result in decreased moisture vapor transmission rates and increased film strength.

Examples 10–13

Examples 10–13 illustrate the effect on foam properties of different types and concentrations of blowing agents. Principle operating conditions are shown in Table 5.

Examples 10–12 were made in a manner similar to Example 5 except the draw rate was 7.6 m/min and the blowing agent concentration in wt. percent was 0.5, 1.5 and 2.0, respectively.

Example 13 was made in a manner similar to Example 5 except for the changed materials and operating conditions shown in Table 5 and extruder 14 was the 1.25″ Killion Single Screw Extruder (Pawcatuck, Conn., Model: KTS 125) with a length to diameter ratio of 24:1, and 3 barrel zones.

Foam density, Tensile and Elongation, Stress Decay, Two Cycle Hysteresis and MVTR were measured and total skin thickness calculated for examples 10–13. Results are shown in Table 6.

TABLE 5

| | Core | | | Skin | | Draw rate | |
|---|---|---|---|---|---|---|---|
| Example | composition | wt ratio | (kg/hr) | composition | extruder rpm | (m/min) | Nip |
| 10 | VECTOR 4211/PS G18/RIC-50 | 86.5/13.0/0.5 | 6.5 | PP7C12N | 10 | 7.6 | N |
| 11 | VECTOR 4211/PS G18/RIC-50 | 85.5/13.0/1.5 | 6.5 | PP7C12N | 10 | 7.6 | N |
| 12 | VECTOR 4211/PS G18/RIC-50 | 85.0/13.0/2.0 | 6.9 | PP7C12N | 10 | 7.6 | N |
| 13 | VECTOR 4211/PS G3/Azo | 85.7/13.0/3.3 | 6.8 | PP7C12N | 10 | 4.6 | N |

TABLE 6

| | Tensile and Elongation | | | | | | Stress Decay | | Two Cycle Hysteresis | | | Thickness | | |
|---|---|---|---|---|---|---|---|---|---|---|---|---|---|---|
| | Load @ 100% | | Load @ 200% | | Max Load | | | | | | | | | |
| Example | CD (N) | MD (N) | CD (N) | MD (N) | CD (N) | MD (N) | Relax (%) | Decay (%) | Relax (%) | Set (%) | MVTR (g/m²/24 hrs) | Total (microns) | Skins (%) | Density (g/cc) |
| 10 | 3.7 | 6.9 | 4.5 | 9.1 | 11.7 | 20.0 | 33.7 | 22.7 | 32.5 | 8.3 | 273 | 86 | 7.5 | 0.94 |
| 11 | 2.4 | 4.7 | 3.2 | 6.4 | 6.5 | 7.5 | 33.2 | 26.7 | 34.5 | 9.6 | 2324 | 140 | 7.5 | 0.59 |
| 12 | 1.9 | 4.1 | 2.7 | 5.5 | 5.5 | 5.6 | 29.9 | 22.0 | 29.6 | 8.1 | 5195 | 147 | 7.5 | 0.60 |
| 13 | 3.2 | 7.1 | 4.5 | 9.6 | 10.3 | 11.5 | 26.1 | 20.7 | 26.3 | 8.3 | 3564 | 189 | 12.8 | 0.75 |

As seen in Table 6, both the concentration and type of blowing agent may affect the moisture vapor transmission rate and density of the foam article.

Examples 14–18

Examples 14–18 illustrate the effect on foam properties of different core materials.

Examples 14–18 were made in a manner similar to Example 5 except for the polymeric component of the core materials and the draw rates as shown in Table 7. In addition, the foams of Examples 14 and 15 were cast into a closed nip. Principle operating conditions are shown in Table 7.

Foam density, Tensile and Elongation, Stress Decay, Two Cycle Hysteresis and MVTR were measured and total skin thickness calculated for examples 14–18. Results are shown in Table 8.

TABLE 7

| | Core | | | Skin | | Draw rate | |
|---|---|---|---|---|---|---|---|
| Example | composition | wt ratio | (kg/hr) | composition | extruder rpm | (m/min) | Nip |
| 14 | ENGAGE 8200/RIC-50 | 98.0/0.5 | 4.7 | PP7C12N | 10 | 3.7 | Y |
| 15 | PF 814/RIC-SO | 98.0/0.5 | 3.4 | PP7C12N | 10 | | |
| 16 | VECTOR 4211/PS 207/RIC-50 | 85.0/13.0/2.0 | 6.0 | PP7C12N | 10 | 4.9 | N |
| 17 | KRATON 8430/PS G18/RIC-50 | 85.0/13.0/2.0 | 6.5 | PP7C12N | 10 | 4.6 | N |
| 18 | VECTOR 4111/PS G18/RIC-50 | 85.0/13.0/2.0 | 6.3 | PP7C12N | 10 | 4.6 | N |

TABLE 8

| | Tensile and Elongation | | | | | | Stress Decay | | Two Cycle Hysteresis | | | Thickness | | |
|---|---|---|---|---|---|---|---|---|---|---|---|---|---|---|
| | Load @ 100% | | Load @ 200% | | Max Load | | | | | | | | | |
| Example | CD (N) | MD (N) | CD (N) | MD (N) | CD (N) | MD (N) | Relax (%) | Decay (%) | Relax (%) | Set (%) | MVTR (g/m²/24 hrs) | Total (microns) | Skins (%) | Density (g/cc) |
| 14 | 6.2 | 8.0 | 7.5 | 9.2 | 7.8 | 16.0 | 34.7 | 32.3 | 34.7 | 23.7 | 205 | 157 | 8.6 | 0.68 |
| 15 | — | — | — | — | 9.3 | 31.7 | — | — | — | — | 4377 | 102 | 8.0 | 0.57 |
| 16 | 2.8 | 6.2 | 3.8 | 8.5 | 8.5 | 10.1 | 28.5 | 18.8 | 28.6 | 7.2 | 1186 | 178 | 8.2 | 0.55 |
| 17 | 4.8 | 9.0 | 6.2 | 12.1 | 19.3 | 20.5 | 32.5 | 22.0 | 33.0 | 9.1 | 1432 | 168 | 8.3 | 0.65 |
| 18 | 3.6 | 5.3 | 4.7 | 6.7 | 15.2 | 21.9 | 31.7 | 19.0 | 32.0 | 9.5 | 395 | 159 | 8.3 | 0.62 |

As seen in Table 8, changing the type of polymeric material in the core may affect both the strength and the moisture vapor transmission rate of the resulting article.

Examples 19–25

Examples 19–25 illustrate the effect on foam properties of laminate layers on the foam articles. Principle operating conditions are shown in Table 9.

Example 19 is a tri-layer foam construction having no added laminate layers. Example 19 was made in a manner similar to Example 5 except for the changed core material and process conditions as shown in Table 9.

Example 20 is a tri-layer foam construction having an added laminate layer on one major surface. Example 20 was made by the method described in Example 19 except a web of nonwoven material (a carded nonwoven of 2–3 denier fiber and basis weight of about 3 g/m²) was wrapped over nip roll 24 such that the foam and nonwoven material were laminated as the foam was fed into the closed nip.

Example 21 is a tri-layer foam construction having added laminate layers on both major surfaces. Example 21 was made by the method described in Example 19 except one web of the nonwoven material was wrapped over casting drum 22 upstream from the die exit and another web of nonwoven material was wrapped over nip roll 24 so that when the extruded foam was fed into a closed nip, a sandwich structure, having the foam as a core layer, was formed.

Example 22 is a tri-layer foam construction having no added laminate layers. Example 22 was made in a manner similar to Example 19 except the amount of blowing agent in the core layer was decreased, the core layer material was changed, and some process conditions were changed, as shown in Table 9.

Example 23 is a tri-layer foam construction having an added laminate layer on one major surface. Example 23 was made by the method described in Example 22 except a web of nonwoven material (a carded nonwoven of 2–3 denier fiber and basis weight of about 3 g/m²) was wrapped over nip roll 24 such that the foam and nonwoven material were laminated as the foam was fed into a closed nip.

Example 24 is a tri-layer foam construction having added laminate layers on both major surfaces. Example 24 was made by the method described in Example 22 except one web of the nonwoven material was wrapped over casting drum 22 upstream from the die exit and another web of nonwoven material was wrapped over nip roll 24 so that when the extruded foam was fed into a closed nip, a sandwich structure, having the foam as a core layer, was formed.

Example 25 was made as Example 23 except the resulting extrusion laminated article was subjected to post-production stretching in an INSTRON Tensile Tester. The 10.2 cm long by 2.54 cm wide sample was placed between the jaws of the tensile tester using a 5.1 cm jaw gap. The jaws were drawn apart at 50.8 cm/min to 100% strain or 5.1 cm extension. The product was sustained at this extension for 30 seconds before the crosshead was returned to zero extension.

Foam density, Tensile and Elongation, Stress Decay, Two Cycle Hysteresis and MVTR were measured and total skin thickness calculated for examples 19–25. Results are shown in Table 10.

TABLE 9

| | Core | | | Skin | | Draw rate | |
|---|---|---|---|---|---|---|---|
| Example | composition | wt ratio | (kg/hr) | composition | extruder rpm | (m/min) | Nip |
| 19 | VECTOR 4211/PS 207/RIC-50 | 85.0/13.0/2.0 | 6.0 | PP7C12N | 3.5 | 5.2 | N |
| 20 | VECTOR 4211/PS 207/RIC-50 | 85.0/13.0/2.0 | 6.0 | PP7C12N | 3.5 | 5.1 | Y |
| 21 | VECTOR 4211/PS 207/RIC-50 | 85.0/13.0/2.0 | 6.0 | PP7C12N | 3.5 | 5.1 | Y |
| 22 | VECTOR 4111/PS 207/RIC-50 | 85.5/13.0/1.5 | 5.5 | PP7C12N | 10 | 4.9 | N |
| 23 | VECTOR 4111/PS 207/RLC-50 | 85.5/13.0/1.5 | 5.4 | PP7C12N | 10 | 4.9 | Y |
| 24 | VECTOR 4111/PS 207/RIC-50 | 85.5/13.0/1.5 | 5.4 | PP7C12N | 10 | 4.9 | Y |
| 25 | VECTOR 4111/PS 207/RIC-50 | 85.5/13.0/1.5 | 5.4 | PP7C12N | 10 | 4.9 | Y |

TABLE 10

| | Tensile and Elongation | | | | | | Stress Decay | | Two Cycle Hysteresis | | | Thickness | | |
|---|---|---|---|---|---|---|---|---|---|---|---|---|---|---|
| | Load @ 100% | | Load @ 200% | | Max Load | | | | | | | | | |
| Example | CD (N) | MD (N) | CD (N) | MD (N) | CD (N) | MD (N) | Relax (%) | Decay (%) | Relax (%) | Set (%) | MVTR (g/m²/24 hrs) | Total (microns) | Skins (%) | Density (g/cc) |
| 19 | 1.5 | 3.8 | 2.2 | 5.3 | 5.8 | 5.0 | 18.3 | 15.4 | 17.8 | 5.5 | 3450 | 164 | 4.5 | 0.56 |
| 20 | 7.5 | — | 9.6 | — | 9.6 | 31.8 | 32.1 | 25.6 | 31.1 | 9.7 | 1105 | 164 | 4.6 | N/A |
| 21 | 14.7 | 76.2 | 16.3 | — | 17.0 | 79.9 | 33.4 | 31.1 | 33.5 | 14.4 | 791 | 164 | 4.6 | N/A |
| 22 | 1.9 | 4.5 | 2.6 | 6.0 | 6.1 | 10.4 | 29.8 | 20.3 | 30.2 | 10.9 | 955 | 147 | 8.2 | 0.56 |
| 23 | 8.4 | 36.8 | 8.1 | — | 9.7 | 39.8 | 33.2 | 27.1 | 33.5 | 13.8 | 464 | 147 | 8.2 | N/A |
| 24 | 14.9 | 73.5 | — | — | 16.6 | 73.4 | 33.5 | 30.3 | 33.5 | 13.4 | 273 | 147 | 8.2 | N/A |
| 25 | 2.8 | — | 10.3 | — | 19.0 | — | 33.8 | 26.3 | 33.9 | 5.5 | 812 | 147 | 8.2 | N/A |

As seen in Table 10, the moisture vapor transmission rate of articles of the invention may be affected by the thickness of the skin layers and the presence of porous laminates on one side or both sides of the article. MVTR may also be affected by post-production processing such as stretching.

Examples 26–27

Examples 26–28 Illustrate the effect on foam properties of varying the draw rate.

Example 26 was made in a manner similar to Example 5 except some materials and process conditions were changed as shown in Table 5 and extruder 14 was the 1.25" Killion Single Screw Extruder 14 (Pawcatuck, Conn., Model: KTS 125) with a length to diameter ratio of 24:1, and 3 barrel zones. Principle operating conditions are shown in Table 11.

Examples 27 and 28 were made in the same manner as Example 26 except the draw rate was 3.7 and 4.6 meters per minute, respectively.

Foam density, Tensile and Elongation, Stress Decay, Two Cycle Hysteresis and MVTR were measured and total skin thickness was calculated for examples 26–28. Results are shown in Table 12.

TABLE 11

| | Core | | | Skin | | Draw rate | |
|---|---|---|---|---|---|---|---|
| Example | composition | wt ratio | (kg/hr) | composition | extruder rpm | (m/min) | Nip |
| 26 | VECTOR 4211/PS G3/Azo | 85.7/13.0/3.3 | 6.8 | PP7C12N | 10 | 2.4 | N |
| 27 | VECTOR 4211/PS G3/Azo | 85.7/13.0/3.3 | 6.8 | PP7C12N | 10 | 3.7 | N |
| 28 | VECTOR 4211/PS G3/Azo | 85.7/13.0/3.3 | 6.8 | PP7C12N | 10 | 4.6 | N |

TABLE 12

| | Tensile and Elongation | | | | | | Stress Decay | | Two Cycle Hysteresis | | | Thickness | | |
|---|---|---|---|---|---|---|---|---|---|---|---|---|---|---|
| | Load @ 100% | | Load @ 200% | | Max Load | | | | | | | | | |
| Example | CD (N) | MD (N) | CD (N) | MD (N) | CD (N) | MD (N) | Relax (%) | Decay (%) | Relax (%) | Set (%) | MVTR (g/m²/24 hrs) | Total (microns) | Skins (%) | Density (g/cc) |
| 26 | 7.4 | 14.0 | 10.0 | 18.3 | 33.4 | 44.9 | 24.3 | 19.7 | 23.4 | 5.0 | 55 | 183 | 12.8 | 0.82 |
| 27 | 4.4 | 9.3 | 6.0 | 12.6 | 20.7 | 23.7 | 26.6 | 21.2 | 25.7 | 7.8 | 1800 | 128 | 7.8 | 0.79 |
| 28 | 3.2 | 7.1 | 4.5 | 9.6 | 10.3 | 11.5 | 26.1 | 20.7 | 26.3 | 8.3 | 3564 | 189 | 118 | 0.75 |

As seen in Table 12, increasing the draw rate may result in increased moisture vapor transmission rates.

Other embodiments of the invention are within the scope of the following claims.

What is claimed is:

1. An article comprising a breathable three layer ABA or ABC structure, said article comprising:
   (a) an inner core layer having a thickness of about 86 to about 265 microns, said inner core layer comprising a breathable thermoplastic foam having at least one major surface and at least one ruptured foam cell, wherein the inner core layer has breathability in a direction perpendicular to a major surface of the foam, and
   (b) two outer skin layers that are melt-bonded to the inner core layer, wherein each of the outer skin layers comprise a ruptured unfoamed, polymeric material selected from the group consisting of amorphous or non-amorphous thermoplastic materials, elastomers, thermoplastic elastomers, and semi-crystalline polymers.

2. The article of claim 1 wherein the B layer is a thermoplastic elastomer.

3. The article of claim 1 having a moisture vapor transmission rate greater than 300 grams per square meter per 24 hours.

4. The article of claim 1 further comprising a pressure sensitive adhesive layer affixed to a major surface of at least one outer skin layer.

5. The article of claim 1 further comprising a material laminated to at least one outer skin layer.

6. The article of claim 1, wherein the foam cell was ruptured by stretching the article.

* * * * *

UNITED STATES PATENT AND TRADEMARK OFFICE
CERTIFICATE OF CORRECTION

| | | |
|---|---|---|
| PATENT NO. | : 7,083,849 B1 | Page 1 of 1 |
| APPLICATION NO. | : 09/325963 | |
| DATED | : December 15, 2006 | |
| INVENTOR(S) | : Bonnie W. Albrecht et al. | |

It is certified that error appears in the above-identified patent and that said Letters Patent is hereby corrected as shown below:

On Title Page item 75
Per the petition Decision of December 15, 2006, the inventorship of this patent is amended to be:

Bonnie W. Albrecht
Mark D. Gehlsen
Connie L. Hubbard
David L. Vall
Bryan C. Feisel
Steven J. Flynn Signed and Sealed this Sixteenth Day of January, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,083,849 B1 | Page 1 of 1 |
| APPLICATION NO. | : 09/325963 | |
| DATED | : August 1, 2006 | |
| INVENTOR(S) | : Bonnie W. Albrecht et al. | |

It is certified that error appears in the above-identified patent and that said Letters Patent is hereby corrected as shown below:

On Title Page item 75
Per the petition Decision of December 15, 2006, the inventorship of this patent is amended to be:

Bonnie W. Albrecht
Mark D. Gehlsen
Connie L. Hubbard
David L. Vall
Bryan C. Feisel
Steven J. Flynn This certificate supersedes Certificate of Correction issued January 16, 2007.

Signed and Sealed this

Sixth Day of February, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,083,849 B1 |
| APPLICATION NO. | : 09/325963 |
| DATED | : August 1, 2006 |
| INVENTOR(S) | : Bonnie Weiskopf Albrecht |

It is certified that error appears in the above-identified patent and that said Letters Patent is hereby corrected as shown below:

Title Page
Item [56], References Cited, OTHER PUBLICATIONS, Delete "p." and insert -- pp. --, therefore.

Item [57], Abstract, Line 1 Delete "foam" and insert -- foams --, therefore.

Column 2
Line 8, Delete ""breathable"or" and insert -- "breathable" or --, therefor. (Consider space)
Line 19, Delete "barrel and" and insert -- barrel, and --, therefor.
Line 33, Delete "salvation" and insert -- solvation --, therefor.
Line 41, After "state" insert -- , --.

Column 3
Line 33 Delete "4c," and insert -- 4c. --, therefor.

Column 5
Line 8, Delete "adjacent:" and insert -- adjacent; --, therefor.
Line 23, After "5,599,602" insert -- , --, therefore.
Line 33, Delete "art," and insert -- art; --, therefor.

Column 6
Line 7, After "5,143,679" insert -- , --.
Line 21, After "50%" insert -- , --.
Line 53, Delete "formed A" and insert -- formed. A --, therefor.

Column 7
Line 7, Delete "blocking." and insert --blocking, --, therefor.
Line 41, After "Generally" insert -- , --.
Line 56, Delete "Satas." and insert -- Satas, --, therefor.

Column 8
Line 43, After "(SBR)" insert -- , --.
Line 44, After "siloxanes" insert -- , --.
Line 46, Delete "blends)" and insert -- blends), --, therefor.

UNITED STATES PATENT AND TRADEMARK OFFICE
CERTIFICATE OF CORRECTION

PATENT NO. : 7,083,849 B1
APPLICATION NO. : 09/325963
DATED : August 1, 2006
INVENTOR(S) : Bonnie Weiskopf Albrecht It is certified that error appears in the above-identified patent and that said Letters Patent is hereby corrected as shown below:

Column 9
Line 23, After "hydrazide" insert -- , --.
Line 29, Delete "D," and insert -- D., --, therefor.
Line 30, Delete "(editors)." and insert -- (editors), --, therefor.
Line 31, After "17" insert -- , --.
Line 51, After "semi-crystalline" insert -- , --.

Column 11
Line 29, Delete "Inc." and insert -- Inc., --, therefor.
Line 61, After "cm/min" insert -- , --.

Column 12
Line 8, Delete "50%" and insert -- @50% --, therefor.
Line 27, Delete "@)100%" and insert -- @100% --, therefor.
Line 28, Delete "extension min" and insert -- extension @ min --, therefor.
Line 37, After "hole" insert -- , --.
Line 39, After "jar" insert -- , --.

Column 12 (Table)
Line 4, Delete "polystyrene" and insert -- polystyrene --, therefor.

Column 13
Line 19, Delete "Extrusion Coextrusion" and insert -- Extrusion/Coextrusion --, therefor.
Line 22, Delete "Switzerland." and insert -- Switzerland, --, therefor.
Line 26, Deltee "convened" and insert -- conveyed --, therefor.
Line 41, After "Conn." insert -- , --.
Line 49, After "Corporation" insert -- , --.
Line 54, After "Company" insert -- , --.
Line 54, After "Tex." insert -- , --.
Line 65, Delete "sections to" and insert -- sections, to --, therefor.

Column 14
Line 38, Delete "gap." and insert -- gap, --, therefor.

Column 15
Line 26, Delete "DS15HM." and insert -- DS15HM, --, therefor.

Column 15-16 (Table 3)
Line 3, Delete "618/RIC-50" and insert -- G18/RIC-50 --, therefor.
Line 4, Delete "1()" and insert -- 10 --, therefor.

UNITED STATES PATENT AND TRADEMARK OFFICE
CERTIFICATE OF CORRECTION

PATENT NO.         : 7,083,849 B1
APPLICATION NO. : 09/325963
DATED                 : August 1, 2006
INVENTOR(S)       : Bonnie Weiskopf Albrecht It is certified that error appears in the above-identified patent and that said Letters Patent is hereby corrected as shown below:

Columns 17-18 (Table 7)
Line 4, Delete "PF 814/RIC-SO" and insert -- PF 814/RIC-50 --, therefor.
Line 4, Below "3.7" insert -- 5.8 --.
Line 4, Below "Y" insert -- Y --.

Columns 19-20 (Table 9)
Line 7, Delete "207/RLC-50" and insert -- 207/RIC-50 --, therefor.

Columns 21-22 (Table 12)
Line 7, Delete "118" and insert -- 12.8 --, therefor.

Signed and Sealed this

Thirteenth Day of November, 2007

JON W. DUDAS
*Director of the United States Patent and Trademark Office*